US006465410B1

(12) United States Patent
Bettiol et al.

(10) Patent No.: US 6,465,410 B1
(45) Date of Patent: *Oct. 15, 2002

(54) LAUNDRY DETERGENT AND/OR FABRIC CARE COMPOSITION COMPRISING A MODIFIED ANTIMICROBIAL PROTEIN

(75) Inventors: Jean-Luc Philippe Bettiol, Brussels (BE); Johan Smets, Lubbeek (BE); Stanton Lane Boyer, Fairfield, OH (US)

(73) Assignee: The Procter & Gamble, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,471

(22) PCT Filed: Apr. 30, 1999

(86) PCT No.: PCT/US99/09455

§ 371 (c)(1), (2), (4) Date: Nov. 1, 2000

(87) PCT Pub. No.: WO99/57157

PCT Pub. Date: Nov. 11, 1999

(51) Int. Cl.[7] .............................. C11D 3/00; C11D 7/42; C12S 9/00

(52) U.S. Cl. ........................ 510/392; 510/392; 510/305; 510/312; 510/276; 510/320; 510/374; 435/7.1; 435/68.1; 435/69.1; 435/188

(58) Field of Search ................................. 510/392, 305, 510/312, 320, 276, 374; 435/7.1, 68.1, 69.1, 188

(56) References Cited

U.S. PATENT DOCUMENTS 5,738,984 A 4/1998 Shoseyov et al. .............. 435/4

FOREIGN PATENT DOCUMENTS

| | | | | |
|---|---|---|---|---|
| EP | 0 425 019 A1 | | 5/1991 | .......... A01N/63/00 |
| WO | WO 94/07998 | | 4/1994 | ............ C12N/9/42 |
| WO | WO 94/14953 | | 7/1994 | ............ C12N/9/42 |
| WO | WO 94/29460 | | 12/1994 | ........... C12N/15/62 |
| WO | WO 96/06532 | | 3/1996 | .......... A01N/63/00 |
| WO | WO-97/24421 | * | 7/1997 | ..................... 3/386 |
| WO | WO-97/28243 | * | 8/1997 | ..................... 3/386 |
| WO | WO-97/28256 | * | 8/1997 | ..................... 3/386 |
| WO | WO 97/31999 | | 9/1997 | ........... C11D/3/386 |

OTHER PUBLICATIONS

XP–00209037 Maglione et al. Properties of a Genetically Reconstructed Prevotella Ruminicola Endoglucanase.

XP 002090936 Tomme et al. Comparison of a Fungal (Family I) and Bacterial (Family II) Cellulose–Binding Domain.

XP–002090915 Zhang et al. Determinants of Recombinant Production of Antimicrobial Cationic Peptides and Creation of Peptide Variants in Bacteria.

Poole et al. Characterization of hybrid Proteins Consisting of the Catalytic Domains of Clostridium and Ruminococcus Endoglucanases, fused to Pseudomonas Non–Catalytic Cellulose–Binding Domains.

* cited by examiner

*Primary Examiner*—Yogendra N. Gupta
*Assistant Examiner*—Eisa Elhilo
(74) *Attorney, Agent, or Firm*—C. Brant Cook; Kim W. Zerby; Steve W. Miller

(57) ABSTRACT

A modified protein which comprises a catalytically active amino acid sequence of an antimicrobial enzyme and/or an amino acid sequence of an antimicrobial peptide linked to an amino acid sequence comprising a cellulose binding domain (CBD), and laundry detergents and/or fabric care compositions comprising such modified protein for improved sanitization benefits, are provided by the present invention.

8 Claims, No Drawings

LAUNDRY DETERGENT AND/OR FABRIC CARE COMPOSITION COMPRISING A MODIFIED ANTIMICROBIAL PROTEIN

FIELD OF THE INVENTION

The present invention relates to laundry detergent and/or fabric care compositions comprising a modified protein which comprises a catalytically active amino acid sequence of an antimicrobial enzyme and/or an amino acid sequence of an antimicrobial peptide, linked to an amino acid sequence comprising a Cellulose Binding Domain (CBD), for sanitisation benefits.

BACKGROUND OF THE INVENTION

Modern laundry detergent and/or fabric care compositions contain various detergent ingredients having one or more purposes in obtaining fabrics which are not only clean but also have retained appearance and integrity. Therefore, detergent components such as perfumes, soil release agents, fabric brightening agents, fabric softeners, chelants, bleaching agents and catalysts, dye fixatives and enzymes, have been incorporated in laundry detergent and/or fabric care compositions. One of such specific example is the use of enzymes, especially proteases, lipases, amylases and/or cellulases. The use of enzymes to remove stains comprising proteins and/or carbohydrates, in combination with various detergent, is well known in the art of detergent formulations.

Moreover, laundry detergent and/or fabric care composition having antimicrobial activities are of interest to consumers. Efforts to formulate antimicrobial hand soaps and cleaning compositions are well known. Efforts to produce laundry compositions comprising enzymes having microbial properties are also known. In spite of such efforts, there continues to be a need for laundry detergent and/or fabric care compositions having antimicrobial activity.

However, it has been difficult to incorporate enzymes into modern detergents in an effective manner. In that regard, those skilled in the art have sought to use minimal amounts of enzyme to their fullest effectiveness by ensuring that most, if not all, of the enzyme comprised in the detergent composition deposits on the fabric. For example, the optimum cellulase would have a binding domain especially suitable for cellulose. In this way, most of the cellulase enzyme included in the detergent composition deposits or otherwise binds to the fabric during the laundering cycle to achieve its desired results.

Similarly, it would be desirable to have laundry detergent and/or fabric care compositions in which its enzymatic and/or peptidic components are also modified to ensure deposition onto the fabrics for improved or new performances.

Accordingly, there remains a need for laundry detergent and/or fabric care compositions which provide improved sanitisation of the fabrics to be laundered. There also remains a need for such antimicrobial enzymes and/or antimicrobial peptide which are suitable for use in modern laundry detergent and/or fabric care compositions to be formulated in an effective manner.

The above objectives have been met by formulating laundry detergent and/or fabric care compositions comprising a modified protein which comprises a catalytically active amino acid sequence of an antimicrobial enzyme and/or an amino acid sequence of an antimicrobial peptide, linked to an amino acid sequence comprising a Cellulose Binding Domain (CBD), for sanitisation benefits. It has been surprisingly found that said modified protein more readily attaches, affixes or otherwise comes into contact with the fabric, thereby resulting in increased or enhanced performance of the enzyme and/or antimicrobial peptide. In particular, the laundry detergent and/or fabric care compositions of the present invention when comprising proteins so modified, provide a higher effective concentration of the enzyme and/or antimicrobial peptide at its substrate location and therefore, improved sanitisation benefits.

Enzymes linked to Cellulose Binding Domains are also described in the art: WO91/10732 novel derivatives of cellulase enzymes combining a core region derived from an endoglucanase producible by a strain of Bacillus spp., NICMB 40250 with a CBD derived from another cellulase enzyme or a combining a core region derived from another cellulase enzyme with a CBD derived from said endoglucanase, for improved binding properties. WO94/07998 describes cellulase variants of a cellulase classified in family 45, comprising a CBD, a Catalytically Active Domain (CAD) and a region linking the CBD to the CAD, wherein one or more amino acid residues have been added, deleted or substituted and /or another CBD is added at the opposite end of the CAD. WO95116782 relates to the cloning and high level expression of novel truncated cellulase proteins or derivatives thereof in *Trichoderma longibrachiatum* comprising different core regions with several CBDs. WO97/01629 describes cellulolytic enzyme preparation wherein the mobility of the cellulase component may be reduced by adsorption to an insoluble or soluble carrier e.g. via the existing or newly introduced CBD. WO97/28243 describes a process for removal or bleaching or soiling or stains from cellulosic fabrics wherein the fabric is contacted in aqueous medium with a modified enzyme which comprises a catalytically active amino acid sequence of a non-cellulolytic enzyme selected from amylases, proteases, lipases, pectinases and oxidoreductases, linked to an amino acid sequence comprising a cellulose binding domain and a detergent composition comprising such modified enzyme and a surfactant.

U.S. Pat. No. 5,258,304 describes methods using Type II endoglycosidases alone or in combination with other enzymes, detergents, surfactants and/or disulfide cleaving reagents to facilitate the removal of micro-organisms such as bacteria from the surface of materials such as fabric, contact lenses, metal, ceramics, cell tissue and the like. A method for cleaning a surface on which is bound a glycoside-containing substance such as blood or components thereof, fecal matter or components thereof or micro-organisms is described in U.S. Pat. No. 5,238,843. U.S. Pat. No. 5,395,541 discloses cleaning compositions containing a first enzyme selected from Endo-D, Endo-H, Endo-L, Endo-C, Endo-CII, Endo-F-Gal type, Endo-F and/or PNGaseF; a second enzyme selected from protease, lipase, nuclease, glycosidase; a detergent surfactant and a builder. The substrates can be blood or components thereof, fecal matter or components thereof or microorganisms and the surfaces can be fabrics, biological tissue, tooth enamel, contact lens, glass, ceramic, metal, metal alloy, plastic, plant, fruit and vegetables. U.S. Pat. No. 5,356,803 describes an antimicrobial composition consisting essentially of a Type II endoglycosidase and antimicobial agent such as bactericide, fungicide and/or algicide, used in the form of personal care or household cleaning products such as laundry detergent. U.S. Pat. No. 5,041236 is directed to an antimicrobial composition comprising endo-β-N-acetylglucosaminidase and/or endoglycopeptidase and ruminant stomach lysozyme and a method for destroying or removing microbes by treatment with these enzymes.

U.S. patent application Ser. No. 60/045,756 filed Jun. 5, 1997 describes laundry or cleaning products comprising one or more hexosaminidase and methods for laundering fabrics and cleaning hard surfaces with an aqueous solution containing an effective amount of one or more hexosaminidase enzymes. U.S. patent application Ser. No. 601045,826 filed May 5, 1997 describes laundry or cleaning products comprising one or more enzymes exhibiting endoglucanase activity specific for xyloglucan and methods for laundering fabrics and cleaning hard surfaces with an aqueous solution containing an effective amount of one or more enzymes exhibiting endoglucanase activity specific for xyloglucan.

Patent application PCT/US97102534 discloses cleaning compositions comprising an endo-dextranase enzyme, which provide enhanced overall cleaning and sanitisation of the treated surfaces together with malodour control. Similarly, mycodextranases are described in the co-pending application PCT/US96/15572 filed on Sep. 27, 1996.

However, none of these documents disclose a laundry detergent and/or fabric care compositions comprising a modified protein which comprises a catalytically active amino acid sequence of an antimicrobial enzyme and/or an amino acid sequence of an antimicrobial peptide linked to an amino acid sequence comprising a Cellulose Binding Domain, thereby providing increased or enhanced performance of the laundry detergent and/or fabric care composition.

SUMMARY OF THE INVENTION

The present invention relates to a modified protein comprising a catalytically active amino acid sequence of an antimicrobial enzyme and/or an amino acid sequence of an antimicrobial peptide linked to an amino acid sequence comprising a Cellulose Binding Domain (CBD). The present invention further relates to a laundry detergent and/or fabric care composition comprising said modified protein and to the use of these modified proteins for sanitisation benefits.

DETAILED DESCRIPTION OF THE INVENTION

The present invention relates to a modified protein which comprises a catalytically active amino acid sequence of an antimicrobial enzyme and/or an amino acid sequence of an antimicrobial peptidelinked to an amino acid sequence comprising a Cellulose Binding Domain for sanitisation benefits; being referred to herein after as "Enzyme hybrid" and/or "Antimicrobial peptide hybrid".

As used herein, "sanitisation" includes the removal, killing, inhibition of growth, change in gross morphology, protoplast formation and/or degradation of the cell wall of a microorganism. Also included are the removal of microorganisms from a surface and the prevention of microorganism attachment to surfaces.

Sanitisation includes all positive effects obtained by the inhibition or reduction of microbial activity on fabrics, such as the prevention of malodour development and bacterial/fungal growth. For example, it provides prevention of malodour development on stored and weared fabrics. In particular, the composition of the invention will inhibit or at least reduce the bacterial and/or fungal development on moist fabric waiting for further laundry processing and thereby preventing the formation of malodour.

The sanitisation potential of the detergent compositions of the present invention can be enhanced by the addition of chemical sanitisers such as Triclosan and/or hexemidine. Parfums Cosmétiques Actualités No 125, November, 1995, 51–4 describes suitable chemical sanitisers (also called antimicrobial agent). Such antimicrobial agents in general are antibiotics and include agents which kill micro-organism and those which inhibit microorganism growth. Examples of such antimicrobial agents include, bacteriocides, fungicides and algicides each of which are capable of killing or inhibiting the growth of bacteria, fungi or algae respectively. Bacteriocides include compounds such as chlorohexidine, 2,4,4'-trichloro-2'-hydrodiphenyl ether, triclocarban, penicillins, tetracycline and bacitracin. Fungicides include nystatin (Fungicidin®), amphotericin B (Fungizone®), benomyl (Benlate®), captan (Merpan®), dichlorobenzalkonium chloride (Dichlorane®). [Merck Index, $10^{th}$ Ed. (1983), Merck and Co., Inc., Rahway, N.J.] Other examples of antimicrobial agents include detergent surfactant such as anionic, nonionic, zwitterionic, ampholytic and cationic surfactants known by those skilled in the art, in an amount sufficient to produce an antimicrobial effect.

Also suitable are substances capable of cleaving disulfide bonds such as oxidising agents, reducing agents and some miscellaneous compounds such as fumaric acid and sodium sulfite. Such substances capable of cleaving disulfide bonds are described in U.S. Pat. No. 5,356,803.

The sanitisation benefits of the detergent compositions of the present invention can be evaluated by the Minimum Inhibitory Concentration (MIC) as described in Tuber. Lung. Dis. 1994 August; 75(4):286–90; J. Clin. Microbiol. 1994 May; 32(5):1261–7 and J. Clin. Microbiol. 1992 October; 30(10):2692–7.

The Antimicrobial Pepfide (Antimicrobial Peptide Hybrid or Modified Peptide)

Without wishing to be bound by theory, it is believed that the addition of a cellulose binding domain to an antimicrobial peptide, allows a higher concentration of the antimicrobial peptide onto the fabric, i.e. a closer and/or more lasting contact, resulting in a more efficient antimicrobial activity. Such modified antimicrobial peptides have an increased affinity (relative to unmodified antimicrobial peptides) for binding to a cellulosic fabric or textile. It has been surprisingly found that said modified antimicrobial peptides when linked to a CBD provide improved sanitisation of the treated fabric or textile.

Suitable antimicrobial peptides are the bacterial pore-forming proteins alpha-hemolysin and streptolysin-O described in Scientific American September 1997, H. Bayley pp62–67. Other suitable antimicrobial peptides are grouped under the name Bioactive Proteins: Protoamines, Cecropins, Magainins and Defensins such as:

- the antimicrobial products developed by Biosource Technologies INC., known as defensins, especially Indolicidin. Also availabe from Sigma;
- the protoamines available from Sigma and Novo Nordisk,
- the Cecropin A, Cecropin B, Cecropin P1 available from Sigma,
- Magainin I, Magainin II, D-Magainin II amide, Ala-Magainin II amide available from Sigma,
- and the polamino acids Poly-L-Arginine, Poly-D/L-Lysine, Poly-L-Histidine and Demeter Peptide, available from Sigma.

Preferred antimicrobial peptides suitable for the purpose of the present invention are Protoamines, Cecropin B, Magainin II, D-Magainin II amide from Sigma and Indoicidin from Biosource international. These antimicrobial peptide hybrids are generally included in the compositions of the present inventions at a level of from 0.0001% to 5%, preferably from 0.001% to 1%, more preferably 0.001% to 0.05% by weight of the total composition.

The Antimicrobial Enzymes (Enzyme Hybrid or Modified Enzyme)

Without wishing to be bound by theory, it is believed that the addition of a cellulose binding domain to an antimicrobial enzyme, allows a higher concentration of the antimicrobial enzyme onto the fabric, i.e. a closer and/or more lasting contact, resulting in a more efficient enzymatic activity. Such modified antimicrobial enzymes have an increased affinity (relative to unmodified enzyme) for binding to a cellulosic fabric or textile. It has been surprisingly found that said modified antimicrobial enzymes when linked to a CBD provide improved sanitisation of the treated fabric or textile.

Furthermore, the below described antimicrobial enzymes also demonstrate a bleaching activity and a cleaning action. Therefore, it has been surprisingly found that such modified antimicrobial enzymes also provide improved cleaning properties and improved whitening of the treated fabrics.

Suitable antimicrobial enzymes include Endoglycosidase H, Dextranase (3.2.1.11), N-acetyl-beta-D-glucosaminidase (3.2.1.29) Alfa-Mannosidase (3.2.1.24), Lyticase (From Sigma), Lysozyme (3.2.1.17), Xanthine Oxidase (1.2.3.2), Type II Endo-glycosidase, Chitinase (3.2.1.14), Beta 1,6-endoglucanases (3.2.1.33), N-acetyl-D-glucosamine deacetylase, Beta 1,3 glucanase, Neuraminidase (3.2.1.18), Beta Glucosidase (3.2.1.21), Beta galactosidase (3.2.1.23), Beta acetylglucosaminidase (3.2.1.30).

Suitable are any bilirubin oxidase enzyme comprised by the enzyme classification (EC 1.3.3.5) or any monophenol monooxygenase enzyme comprised by the enzyme classification (EC 1.14.99.1). These enzymes may be derived from plants, bacteria or fungi (including filamentous fungi and yeasts).

Said enzymes are normally incorporated in the laundry detergent and/or fabric care composition at levels from 0.0001% to 2% of pure modified enzyme by weight of the composition.

It has been surprisingly found that the laundry detergent and/or fabric care composition comprising said enzyme when linked to a CBD, provide improved cleaning of coloured and enhanced sanitisation of the treated surfaces.

Also suitable are cytochrome enzymes: Cytochrome a, Cytochrome b, Cytochrome c and Cytochrome d, preferably Cytochrome P450 EC 1.14.13, EC 1.14.14, EC 1.14.15 and EC 1.14.99. and the cytochrome P450 bm3 such as described in co-pending patent application U.S. Ser. No. 97/12446. The cytochrome based enzymatic bleaching system requires the presence of an electron transfer system comprising an electron donor compound such as NADH, NADPH and/or sodium sulphite and an electron carrier such as flavoproteins, proteins containing reducible disulfide groups, iron proteins, copper proteins, molybdenum proteins, nickel proteins , vanadium proteins and quino proteins.

In addition to their improved sanitisation benefits, it has been surprisingly found that the laundry detergent and/or fabric care compositions comprising such modified cytochrome, demonstrate improved cleaning, i.e. effective and efficicent cleaning of coloured and/or everyday body soils and improved whitening performance.

Also suitable for the purpose of the present invention, are the specific oxygenases described in the co-pending patent applications U.S. Ser. Nos. PCT/US97/12439, PCT/US97/12280 and PCT/US97/12282, being polyphenol/heterocyclic substrate based oxygenases, proteininc substrate based oxygenases and oxygenases directed to body soils.

Co-pending patent applications U.S. Ser. No. PCT/US97/12439 describes as preferred polyphenol/heterocyclic substrate based oxygenase enzymes for the present invention : the decyclising and hydroxylating mono- and di-oxygenases and more preferred the following enzymes:

1.13.11.3 protocatechuate 3,4-dioxygenase
1.13.11.14 2,3-dihydroxybenzoate 3,4-dioxygenase
1.13.11.17 indole 2,3-dioxygenase
1.13.11.22 caffeate 3,4-dioxygenase
1.13.11.24 quercetin 2,3-dioxygenase
1.13.11.35 pyrogallol 1,2-oxygenase
1.14.11.9 naringenin 3-dioxygenase
1.14.12.7 phtalate 4,5 dioxygenase
1.14.12.10 benzoate 1,2-dioxygenase
1.1.4.12.11 toluene dioxygenase
1.14.13.2 4-hydroxybenzoate 3-monooxygenase/-hydroxylase
1.14.13.12 benzoate 4-monooxygenase
1.14.13.21 flavonoid 3'-monooxygenase Some polyphenol/hetyerocyclic substrate based oxygenases require the presence of a cofactor. In this instance, the laundry detergent and/or fabric care compositions of the present invention will further comprise the corresponding enzymatic cofactor.

The polyphenol/heterocyclic substrate based oxygenase enzyme is incorporated into the laundry detergent and/or fabric care compositions in accordance with the invention preferably at a level of from 0.0001% to 2%, more preferably from 0.001% to 0.5%, most preferably from 0.002% to 0.1% pure modified enzyme by weight of the composition.

It has been surprisingly found that the laundry detergent and/or fabric care compositions comprising said modified polyphenol/heterocyclic substrate based oxygenase, provide improved sanitisation benefits,. In addition, they demonstrate improved cleaning, i.e. effective and efficient cleaning of coloured and/or everdyday body soils and improved whitening performance while providing excellent fabric colour safety.

Co-pending patent application U.S. Ser. No. PCT/US97/12280 describes proteininc substrate based oxygenases such as:

1.13.11.11 tryptophan 2,3-dioxygenase
1.13.11.20 cysteine dioxygenase
1.13.11.26 peptide-tryptophan 2,3-dioxygenase
1.13.11.29 stizolobate synthase
1.13.11.30 stizolobinate synthase
1.13.12.1 arginine 2-monooxygenase
1.13.12.2 lysine 2-monooxygenase
1.13.12.3 tryptophan 2-monooxygenase
1.13.12. 9 phenylalanine 2-monooxygenase
1.13.12.10 lysine 6-monooxygenase
1.13.99.3 tryptophan 2'-dioxygenase
1.14.11.1 γ-butyrobetaine dioxygenase
1.14.11.2 procollagen-prolin,2-oxoglutarate 4-dioxygenase
1.14.11.4 procollagen-lysine,2-oxoglutarate 5-dioxygenase
1.14.11.7 procollagen-prolin,2-oxoglutarate 3-dioxygenase
1.14.11.8 trimethyllysine,2-oxoglutarate dioxygenase
1.14.11.16 peptide-aspartate β-dioxygenase
1.14.16.1 phenylalanine 4-monooxygenase
1.14.16.2 tyrosine 3-monooxygenase
1.14.16.4 tryptophan 5-monooxygenase
1.14.17.3 peptidylglycine monooxygenase Some proteinic substrate based oxygenase enzyme require the presence of a cofactor. In this instance, the laundry detergent and/or fabric care compositions of the present invention will further comprise the corresponding enzymatic cofactor.

The proteinic substrate based oxygenase enzyme is incorporated into the laundry detergent and/or fabric care compositions in accordance with the invention preferably at a level of from 0.0001% to 2%, more preferably from 0.001% to 0.5%, most preferably from 0.002% to 0.1% pure modified enzyme by weight of the composition.

It has been surprisingly found that the laundry detergent and/or fabric care compositions comprising said modified proteinic substrate based oxygenase, provide improved sanitisation benefits. In addition, they demonstrate improved cleaning, i.e. effective and efficient cleaning of proteinic based stains and/or soils such as food and everyday body soils and improved whitening performance.

Copending patent application U.S. Ser. No. PCT/US97/12282 describes oxygenases directed to body soils such as are listed below:

1.13.11.21 β-carotene 15,15'-dioxygenase
1.13.11.25 3,4-dihydroxy-9,10-secoandrosta-1,3,5(10)-tirene-9,17-dione 4,5-dioxygenase
1.14.13.15 cholestanetriol 26-monooxygenase
1.14.13.26 phosphatidylcholine 12-monooxygenase
1.14.13.43 leukotriene-e4 20-monooxygenase
1.14.15.3 alkane 1-monooxygenase
1.14.15.5 corticosterone 18-monooxygenase
1.14.99.3 heme oxygenase
1.14.99.4 progesterone monooxygenase
1.14.99.7 squalene monooxygenase
1.14.99.9 steroid 17a-monooxygenase
1.14.99.10 steroid 21-monooxygenase
1.14.99.11 estradiol 6b-monooxygenase
1.14.99.12 4-androstene-3,17-dioone monooxygenase
1.14.99.14 progesterone 11a-monooxygenase
1.14.99.16 methylsterol monooxygenase
1.14.99.24 steroid 9α-monooxygenase Some oxygenases directed to body soils require the presence of a cofactor. In this instance, the laundry detergent and/or fabric care compositions of the present invention will further comprise the corresponding enzymatic cofactor. The oxygenase directed to body soils enzyme is incorporated into the laundry detergent and/or fabric care compositions in accordance with the invention preferably at a level of from 0.0001% to 2%, more preferably from 0.001% to 0.5%, most preferably from 0.002% to 0.1% pure modified enzyme by weight of the composition.

It has been surprisingly found that the laundry detergent and/or fabric care compositions comprising said modified oxygenase directed to body soils, provide improved sanitisation benefits. In addition, they demonstrate improved cleaning, i.e. effective and efficient everyday body soil removal and improved whitening performance.

Other enzymes known for their sanitisation potential are the enzymes exhibiting endoglucanase activity specific for xyloglucan (Co-pending patent application U.S. Ser. No. 60/045,826, filed May 5, 1997). The laundry detergent and/or fabric care products of the present invention, comprise one or more enzymes exhibiting endoglucanase activity specific for xyloglucan, preferably at a level of from 0.001% to 1%, more preferably from 0.01% to 0.5%, by weight of the composition. As used herein, the term "endoglucanase activity" means the capability of the enzyme to hydrolyze 1,4-β-D-glycosidic linkages present in any cellulosic material, such as cellulose, cellulose derivatives, lichenin, β-D-glucan, or xyloglucan. The endoglucanase activity may be determined in accordance with methods known in the art, examples of which are described in WO 94/14953 and hereinafter. One unit of endoglucanase activity (e.g. CMCU, AVIU, XGU or BGU) is defined as the production of 1 μmol reducing sugar/min from a glucan substrate, the glucan substrate being, e.g., CMC (CMCU), acid swollen Avicell (AVIU), xyloglucan (XGU) or cereal β-glucan (BGU). The reducing sugars are determined as described in WO 94/14953 and hereinafter. The specific activity of an endoglucanase towards a substrate is defined as units/mg of protein. More specifically, the laundry detergent and/or fabric care compositions of the present invention, comprise an enzyme exhibiting as its highest activity XGU endoglucanase activity (hereinafter "specific for xyloglucan"), which enzyme:

i) is encoded by a DNA sequence comprising or included in at least one of the following partial sequences described in the Co-pending patent application U.S. Ser. No. 60/045,826, filed May 5, 1997 or a sequence homologous thereto encoding a polypeptide specific for xyloglucan with endoglucanase activity, ii) is immunologically reactive with an antibody raised against a highly purified endoglucanase encoded by the DNA sequence defined in i) and derived from *Aspergillus aculeatus*, CBS 101.43, and is specific for xyloglucan. More specifically, as used herein the term "specific for xyloglucan" means that the endoglucanse enzyme exhibits its highest endoglucanase activity on a xyloglucan substrate, and preferably less than 75% activity, more preferably less than 50% activity, most preferably less than about 25% activity, on other cellulose-containing substrates such as carboxymethyl cellulose, cellulose, or other glucans. Preferably, the specificity of an endoglucanase towards xyloglucan is further defined as a relative activity determined as the release of reducing sugars at optimal conditions obtained by incubation of the enzyme with xyloglucan and the other substrate to be tested, respectively. For instance, the specificity may be defined as the xyloglucan to β-glucan activity (XGU/BGU), xyloglucan to carboxy methyl cellulose activity (XGU/CMCU), or xyloglucan to acid swollen Avicell activity (XGU/AVIU), which is preferably greater than about 50, such as 75, 90 or 100. The term "derived from" as used herein refers not only to an endoglucanase produced by strain CBS 101.43, but also an endoglucanase encoded by a DNA sequence isolated from strain CBS 101.43 and produced in a host organism transformed with said DNA sequence.

It has been surprisingly found that the laundry detergent and/or fabric care compositions comprising said modified enzyme exhibiting endoglucanase activity specific for xyloglucan, provide improved cleaning and sanitisation of the treated surfaces.

Also encompassed in the present invention are the hexosaminidase enzymes described in Co-pending patent application U.S. Ser. No. 60/045,756, filed Jun. 5, 1997. The laundry detergent and/or fabric care products of the present invention comprise one or more hexosaminidase enzymes, preferably at a level of from about 0.001% to about 1%, more preferably from about 0.01% to about 0.5%, by weight of the composition. More preferred are hexosaminidases having MIC for antimicrobial activity of less than about 0.125%, most preferably less than about 0.025%. As used herein, the term "hexosaminidase enzyme" means those enzymes whose activity is for the hydrolysis of terminal non-reducing N-acetyl-D-hexosamine residues in N-acetyl-β-D-hexosaminides, thereby acting on N-acetylglucosides and N-acetylgalactosides, and are classified under the class of enzymes EC 3.2.1.52 (also known as "β-N-acetylhexosaminidase"). Hexosaminidases are known, for example those exzymes having the SEQ. ID No. 1–5 (Copending patent application U.S. Ser. No. 60/045,756, filed Jun. 5, 1997) in the literature as hexosaminidases. Furthermore, DNA sequences encoding for hexosaminidases are known, for example those having the SEQ ID No. 6 and 7 (Co-pending patent application U.S. Ser. No. 60/045,756, filed Jun. 5, 1997). In addition, a commercially available hexosaminidase is "exo-β-N-acetylglucosaminidase" sold by Boehringer. Thus, more specifically, the laundry detergent and/or fabric care compositions of the present invention comprise a hexosaminidase enzyme exhibiting antimicrobial activity, which enzyme:

i) is encoded by a DNA sequence comprising or included in at least one of the sequences of SEQ ID Nos 6 or 7 as described in Co-pending patent application U.S. Ser. No. 60/045,756, filed Jun. 5, 1997, or a sequence homologous thereto encoding a hexosaminidase polypeptide, ii) is immunologically reactive with an antibody raised against a highly purified hexosaminidase encoded by the DNA sequence defined in i), and is specific for hexosaminidase, iii) is immunologically reactive with an antibody raised against a highly purified hexosaminidase having SEQ ID Nos 1–5 as described in Co-pending patent application U.S. Ser. No. 60/045,756, filed Jun. 5, 1997, and is specific for hexosaminidase, or iv) is a hexosaminidase having SEQ ID Nos 1–5 as described in Co-pending patent application U.S. Ser. No. 60/045,756, filed Jun. 5, 1997, or a hexosaminidase polypeptide sequence homologous thereto. It has been surprisingly found that the laundry detergent and/or fabric care composition comprising said modified hexosaminidase, provide improved cleaning and sanitisation of the treated surfaces.

Endo-dextranases are also suitable enzyme to be modified and included in the laundry detergent and/or fabric care compositions of the present invention. By endo-dextranase enzyme it is meant herein any enzyme which degrade, for instance hydrolyse and/or modify 1,6-alpha-glucosidic linkages in dextran based substrate; dextrans being high molecular weight polysaccharides with a D-glucose backbone characterised by predominantly alpha-D(1–6) links. Endo-dextranases can be of fungal origin e.g. Penicillium species or can be expressed in any other suitable host organism via cloning techniques known in the art. The naturally occurring endo-dextranase from Penicillium lilacinum is especially suited for incorporation in neutral pH or granular detergents. It has been surprisingly found that the laundry detergent and/or fabric care comprising said modified endo-dextranase, provide improved overall cleaning and enhanced sanitisation of the treated surfaces together with malodour control.

Similarly, mycodextranases are suitable enzymes for the purpose of the present invention. These 1,3- 1,4-α-D-glucan 4-glucanohydrolase enzymes hydolysing 1,4-α-D-glucosidic linkages in α-D-glucans containing both 1,3- and 1,4-bonds are described in the co-pending application PCT/US96/15572 filed on Sep. 27, 1996.

It has been surprisingly found that the laundry detergent and/or fabric care compositions comprising said modified mycodextranase, provide improved overall cleaning and enhanced sanitisation of the treated surfaces together with malodour control.

These endo-dextranase and mycodextranase enzymes are generally incorporated in the compositions of the present invention at a level of from $10^{-6}$% to 1%, preferably from $10^{-5}$% to 0.5% pure modified enzyme by weight of the total composition.

Suitable enzymes for the purpose of the present invention comprise Type II endoglycosidases. Type II endoglycosidases are enzymes which are capable of cleaving linkages at or near the juncture of the protein and carbohydrate units of a glycoprotein. Preferably, such type II endoglycosidase are capable of cleaving at least one glycosidic linkage within about three glycosidic linkages of the protein-carbohydrate unit juncture (including the glycosidic linkage comprising the protein-carbohydrate junction). Most preferably, such glycosidic linkages are within about two glycosidic linkages of the protein-carbohydrate unit juncture. Type II endoglycosidases are also defined by their specificities for the particular glycosidic linkages for the known core structure of N— and O— linked glycoproteins. The type II endoglycosidase enzymes are described in details in U.S. Pat. No. 5,395,541, U.S. Pat. No. 5,041,236 and U.S. Pat. No. 5,356,803 and encompass Endo-D, Endo-H, Endo-L, Endo-C, Endo-CII, Endo-F-Gal type, Endo-F and/or PNGaseF. Method for cleaning a surface on which is bound a glycoside-containing substance and method of removing microorganisms from surfaces with Type II endoglycosidases are described respectively in U.S. Pat. No. 5,238,843 and U.S. Pat. No. 5,258,304.

It has been surprisingly found that the laundry detergent and/or fabric care compositions comprising said modified Type II endoglycosidases, provide improved overall cleaning, especially the removal of glycoside-containing substances and provide enhanced sanitisation of the treated surfaces.

Another type of enzyme suitable for the purpose of the present invention is lysozyme. Lysozyme is a mucopeptide glycohydrolase enzyme which hydrolyses 1,4-β links between N-acetyl-muramic acid and N-acetylglucosamine and is thus destructive to cell walls of certain microbes. Ruminant stomach lysozyme is a lysozyme characteristic of the stomach mucosa of mammals with foreguts. It has been surprisingly found that the laundry detergent and/or fabric care compositions comprising said modified lysozyme enzyme, provide enhanced sanitisation of the treated surfaces.

Another suitable antimicrobial enzyme for the purpose of the present invention is the Lyticase enzyme sold by Sigma. This enzyme cleaves poly-β-1,3-glucose in yeast cell walls.

It has been surprisingly found that the laundry detergent and/or fabric care compositions comprising said modified Lyticase enzyme, provide enhanced sanitisation of the treated surfaces.

Finally, the xanthine oxidase enzymes of the EC 1.1.3.22 are contemplated for the compositions of the present invention. Xanthine oxidase is commercially available from Sigma. Xanthine oxidase is a flavoprotein containing iron and molybdenum and catalyses the oxidation of hypoxanthine to xanthine and then to uric acid. Molecular oxygen is the oxidant for both reactions and is reduced to $H_2O_2$. Xanthine oxidase is active on a broad range of substrates including purin derivatives, pteridine and other heterocyclic compounds. The xanthine oxidase is preferably accompanied with an aldehyde enhancer. It has been surprisingly found that the laundry detergent and/or fabric care compositions comprising said modified xanthine oxidase enzyme, provide improved cleaning, especially of carotenoid and polyphenolic stains and provide enhanced sanitisation of the treated surfaces.

Preferred enzymes to be included in the laundry detergent and/or fabric care compositions of the present invention are Exo-α-N acetyl gluosaminidase (EC3.21.50); Endo-β-N-acetyl glucosaminidase (EC 3.21.96); N-acetyl-β-glucosaminidase (EC.3.2.1.52); Dextranase (EC.32.1.11); Lyticase; Xanthine oxidase (EC.1.1.3.22); the protocatechuate 3,4 oxidoreductase (EC.1.13.11.3); Catechol dioxygenase (EC.1.13.11.1); lipoxygenases (EC. 1.13.11.12) and mixtures thereof.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Nowadays, it is common practice to modify wild-type enzymes via protein/genetic engineering techniques in order to optimise their performance efficiency in the laundry detergent and/or fabric care compositions of the invention. For example, the variants may be designed such that the compatibility of the enzyme to commonly encountered ingredients of such compositions is increased. Alternatively, the variant may be designed such that the optimal pH, bleach or chelant stability, catalytic activity and the like, of the enzyme variant is tailored to suit the particular cleaning application.

In particular, attention should be focused on amino acids sensitive to oxidation in the case of bleach stability and on surface charges for the surfactant compatibility. The isoelectric point of such enzymes may be modified by the substitution of some charged amino acids, e.g. an increase in isoelectric point may help to improve compatibility with anionic surfactants. The stability of the enzymes may be further enhanced by the creation of e.g. additional salt bridges and enforcing metal binding sites to increase chelant stability.

Said modified enzymes are normally incorporated in the laundry detergent and/or fabric care composition at levels from 0.0001% to 2% of pure modied enzyme by weight of the composition. The enzymes can be added as separate single ingredients (prills, granulates, stabilised liquids, etc. containing one enzyme) or as mixtures of two or more enzymes (e.g. cogranulates).

The catalytically active amino acid sequence in question may comprise or consist of the whole of—or substantially the whole of—the full amino acid sequence of the mature enzyme in question, or it may consist of a portion of the full sequence which retains substantially the same catalytic (enzymatic) properties as the full sequence.

Modified proteins (enzyme hybrids or antimicrobial peptide hybrids) of the type in question, as well as detailed descriptions of the preparation and purification thereof, are known in the art [see, e.g., WO 90100609, WO 94/24158 and WO 95/16782, as well as Greenwood et al., *Biotechnology and Bioengineering* 44 (1994) pp. 1295–1305]. The production of enzymes hybrid is given in WO 91/10732 wherein novel derivatives of cellulase enzymes combining a core region derived from a Bacillus NICB 40250 endoglucanase with a CBD derived from another cellulase enzyme or a combining a core region derived from another cellulase enzyme with a CBD derived from a Bacillus NICB 40250 endoglucanase, are constructed. WO 95/16782 describes the combinations of different core regions with several CBD and the cloning and high level expression of these novel truncated cellulase proteins or derivatives thereof, in *Trichoderma longibrachiatum.*

They may, e.g., be prepared by transforming into a host cell a DNA construct comprising at least a fragment of DNA encoding the cellulose-binding domain ligated, with or without a linker, to a DNA sequence encoding the enzyme of interest, and growing the transformed host cell to express the fused gene. One relevant, but non-limiting, type of recombinant product (enzyme hybrid and/or antimicrobial peptide hybrid) obtainable in this matter—often referred to in the art as a "fusion protein"—may be described by one of the following general formulae:

A—CBD—MR—X—B

A—X—MR—CBD—B

In the latter formulae, CBD is an amino acid sequence comprising at least the cellulose-binding domain (CBD) per se.

MR (the middle region; a linking region) may be a bond, or a linking group comprising from 1 to about 100 amino acid residues, in particular of from 2 to 40 amino acid residues, e.g. from 2 to 15 amino acid residues. MR may, in principle, alternatively be a non-amino-acid linker (See below).

X is an amino acid sequence comprising the above-mentioned, catalytically (enzymatically) active sequence of amino acid residues of a polypeptide encoded by a DNA sequence encoding the antimicrobial enzyme of interest and/or is an amino acid sequence comprising the above-mentioned sequence of amino acid residues of a polypeptide encoding the antimicrobial peptide of interest.

The moieties A and B are independently optional. When present, a moiety A or B constitutes a terminal extension of a CBD or X moiety, and normally comprises one or more amino acid residues.

It will thus, inter alia, be apparent from the above that a CBD in an enzyme hybrid and/or antimicrobial peptide hybrid of the type in question may be positioned C-terminally, N-terminally or internally in the enzyme hybrid and/or antimicrobial peptide hybrid. Correspondingly, an X moiety in an enzyme hybrid and/or antimicrobial peptide hybrid of the type in question may be positioned N-terminally, C-terminally, or internally in the enzyme hybrid and/or antimicrobial peptide hybrid.

Enzyme hybrids and/or antimicrobial peptide hybrid of interest in the context of the invention include enzyme hybrids and/or antimicrobial peptide hybrid which comprise more than one CBD, e.g. such that two or more CBDs are linked directly to each other, or are separated from one another by means of spacer or linker sequences (consisting typically of a sequence of amino acid residues of appropriate length). Two CBDs in an enzyme hybrid and/or antimicrobial peptide hybrid of the type in question may, for example, also be separated from one another by means of an —MR—X— moiety as defined above. One or more cellulose binding domain can be linked to the N-terminal and/or C-terminal parts of the cellulase core region. Any part of a CBD can be selected, modified, truncated etc.

Preferably, attention will be paid in the construction of enzyme hybrids and/or antimicrobial peptide hybrid of the type in question to the stability towards proteolytic degradation. Two- and multi-domain proteins are particularly susceptible towards proteolytic cleavage of linker regions connecting the domains. Proteases causing such cleavage may, for example, be subtilisins, which are known to often exhibit broad substrate specificities [see, e.g. : Grøn et al., *Biochemistry* 31 (1992), pp. 6011–6018; Teplyakov et al., *Protein Engineering* 5 (1992), pp. 413–420]. Glycosylation of linker residues in eukaryotes is one Nature's ways of preventing proteolytic degradation. Another is to employ amino acids which are less favoured by the surrounding proteases. The length of the linker also plays a role in relation to accessibility by proteases. Which "solution" is optimal depends on the environment in which the enzyme hybrid and/or antimicrobial peptide hybrid is to function. When constructing new enzyme hybrid and/or antimicrobial peptide hybrid molecules, preferably, attention will be paid to the linker stability.

Plasmids

Preparation of plasmids capable of expressing fusion proteins having the amino acid sequences derived from fragments of more than one polypeptide is well known in the art (see, for example, WO 90/00609 and WO 95/16782). The expression cassette may be included within a replication system for episomal maintenance in an appropriate cellular host or may be provided without a replication system, where it may become integrated into the host genome. The DNA may be introduced into the host in accordance with known techniques such as transformation, microinjection or the like.

Once the fused gene has been introduced into the appropriate host, the host may be grown to express the fused gene. Normally it is desirable additionally to add a signal sequence which provides for secretion of the fused gene. Typical examples of useful genes are:

1) Signal sequence—(pro-peptide)—carbohydrate-binding domain—linker—antimicrobial enzyme or antimicrobial peptide sequence of interest, or 2) Signal sequence—(pro-peptide)—antimicrobial enzyme or antimicrobial peptide sequence of interest—linker—carbohydrate-binding domain, in which the propeptide sequence normally contains 5–100, e.g. 5–25, amino acid residues. The recombinant product may be glycosylated or non-glycosylated.

Cellulose Binding Domain (CBD)

In the present context, the terms “amino acid sequence comprising a CBD or Cellulose Binding Domain or CBD” are intended to indicate an amino acid sequence capable of effecting binding of the cellulase to a cellulosic substrate (e.g. as described in P. Kraulis et al., Determination of the three-dimensional structure of the C terminal domain of cellobiohydrolase I from *Trichoderma reesei*. A study using nuclear magnetic resonance and hybrid distance geometry-dynamically simulated annealing. Biochemistry 28:7241–7257, 1989). The classification and properties of cellulose binding domains are presented in P. Tomme et al., in the symposium “Enzymatic degradation of insoluble polysaccharides” (ACS Symposium Series 618, edited by J. N. Saddler and M. H. Penner, ACS, 1995).

Cellulose-binding (and other carbohydrate-binding) domains are polypeptide amino acid sequences which occur as integral parts of large polypeptides or proteins consisting of two or more polypeptide amino acid sequence regions, especially in hydrolytic enzymes (hydrolases) which typically comprise a catalytic domain containing the active site for substrate hydrolysis and a carbohydrate-binding domain for binding to the carbohydrate substrate in question. Such enzymes can comprise more than one catalytic domain and one, two or three carbohydrate-binding domains, and they may further comprise one or more polypeptide amino acid sequence regions linking the carbohydrate-binding domain (s) with the catalytic domain(s), a region of the latter type usually being denoted a “linker”.

Examples of hydrolytic enzymes comprising a cellulose-binding domain are cellulase, xylanases, mannanases, arabinofuranosidases, acetylesterases and chitinases. “Cellulose-binding domains” have also been found in algae, e.g. in the red alga porphyra purpurea in the form of a non-hydrolytic polysaccharide-binding protein [see P. Tomme et al., *Cellulose-binding domains—Classification and Properties in Enzymatic Degradation of Insoluble Carbohydrates*, John N. Saddler and Michael H. Penner (Eds.), ACS Symposium Series, No. 618 (1996)]. However, most of the known CBDs (which are classified and referred to by P. Tomme et al. (op. cit.) as “cellulose-binding domains”] derive from cellulases and xylanases.

In the present context, the term “cellulose-binding domain” is intended to be understood in the same manner as in the latter reference (P. Tomme et al., op. cit. ) The P. Tomme et al. reference classifies more than 120 “cellulose-binding domains” into 10 families (I–X) which may have different functions or roles in connection with the mechanism of substrate binding. However, it is to be anticipated that new family representatives and additional families will appear in the future.

In proteins/polypeptides in which CBDs occur (e.g. enzymes, typically hydrolytic enzymes such as cellulases), a CBD may be located at the N or C terminus or at an internal position.

The part of a polypeptide or protein (e.g. hydrolytic enzyme) which constitutes a CBD per se typically consists of more than about 30 and less than about 250 amino acid residues. For example, those CBDs listed and classified in Family I in accordance with P. Tomme et al. (op. cit.) consist of 33–37 amino acid residues, those listed and classified in Family IIa consist of 95–108 amino acid residues, those listed and classified in Family VI consist of 85–92 amino acid residues, whilst one CBD (derived from a cellulase from *Clostridium thermocellum*) listed and classified in Family VII consists of 240 amino acid residues. Accordingly, the molecular weight of an amino acid sequence constituting a CBD per se will typically be in the range of from about 4 kD to about 40 kD, and usually below about 35 kD.

Cellulose binding domains can be produced by recombinant techniques as described in H. Stålbrand et al., Applied and Environmental Microbiology, March 1995, pp. 1090–1097; E. Brun et al., (1995) Eur. J. Biochem. 231, pp. 142–148; J. B. Coutinho et al., (1992) Molecular Microbiology 6(9), pp. 1243–1252;

In order to isolate a cellulose binding domain of, e.g. a cellulase, several genetic engineering approaches may be used. One method uses restriction enzyme to remove a portion of the gene and then to fuse the remaining gene-vector fragment in frame to obtain a mutated gene that encodes a protein truncated for a particular gene fragment. Another method involves the use of exonucleases such as Ba131 to systematically delete nucleotides either externally from the 5' and the 3' ends of the DNA or internally from a restricted gap within the gene. These gene-deletion methods result in a mutated gene encoding a shortened gene molecule whose expression product may then be evaluated for substrate-binding (e.g. cellulose-binding) ability. Appropriate substrates for evaluating the binding ability include cellulosic materials such as Avicel™ and cofton fibres. Other methods include the use of a selective or specific protease capable of cleaving a CBD, e.g. a terminal CBD, from the remainder of the polypeptide chain of the protein in question.

As already indicated (vide supra), once a nucleotide sequence encoding the substrate-binding (carbohydrate-binding) region has been identified, either as cDNA or chromosomal DNA, it may then be manipulated in a variety of ways to fuse it to a DNA sequence encoding the enzyme or enzymatically active amino acid sequence of interest. The DNA fragment encoding the carbohydrate-binding amino acid sequence, and the DNA encoding the enzyme or enzymatically active amino acid sequence of interest are then ligated with or without a linker. The resulting ligated DNA may then be manipulated in a variety of ways to achieve expression. Preferred microbial expression hosts include certain Aspergillus species (e.g. *A. niger* or *A. oryzae*), Bacillus species, and organisms such as *Escherichia coli* or *Saccharomyces cerevisiae*.

Preferred CBDs for the purpose of the present invention are selected from the group consisting of: CBDs CBHII from *Trichoderrna reesei*, CBDs CenC, CenA and Cex from *Cellulomonas fimi*, CBD CBHI from *Trichoderna reesei*, CBD Cellulozome from *Clostridium cellulovorans*, CBD E3 from *Thermonospora fusca*, CBD-dimer from *Clostridium stecorarium* (NCIMB11754) XynA, CBD from *Bacillus agaradherens* (NCIMB40482) and/or CBD family 45 from *Humicola insolens*. More preferred CBDs for the purpose of the present invention are the CBD CenC from *Cellulomonas fimi*, CBD Cellulozome from *Clostridium cellulovorans* and the CBD originating from the fungal *Humicola Insolens* cellulase sold under the tradename "Carezyme" by Novo Nordisk A/S. Carezyme is an endoglucanase from family 45, derived from *Humicola insolens* DSM1800, having a molecular weight of about 43 kDa and exhibiting cellulolytic activity.

Linking Region

The term "linker" or "linking region" or "Middle region—MR" is intended to indicate a region that might adjoin the CBD and connect it to the catalytically active amino acid sequences of the antimicrobial enzyme and/or to the amino acid sequence of the antimicrobial peptide. When present, this linking can be achieved chemically or by recombinant techniques.

An example of the recombinant technique describing the expression of an enzyme with the CBD of different origin is described in S. Karita et al., (1996) Journal of Fermentation and Bioengineering, Vol. 81, No. 6, pp. 553–556. Preferred linking regions are amino acid linking region (peptides), some examples thereof are described in N. R. Gilkes et al., Microbiol. Rev. 55, 1991, pp. 303–315. The linking region can comprise from 1 to about 100 amino acid residues, in particular of from 2 to 40 amino acid residues, e.g. from 2 to 15 amino acid residues. As stated above, it is preferred to use amino acids which are less favoured by the surrounding proteases. Suitable amino acid linking regions are the *Humicola insolens* family 45 cellulase linker, the NifA gene of *Klebsiella pneumoniae*-CiP linker, the *E. coli* OmpA gene-CiP linker, the E3 cellulase *Thermomonospora fusca* linker and the CenA cellulase linker.; preferably the *Humicola insolens* family 45 cellulase linker and the E3 cellulase *Thermomonospora fusca* linker.

Non amino acidiproteinic compounds, referred to as "non-amino acid" can also be used for the linking of the catalytically active amino acid sequence to the CBD:

1) Suitable non-amino acid linking regions are the polyethylene glycol derivatives described in the Shearwater polymers, Inc. catalog of January 1996, such as the nucleophilic PEGs, the carboxyl PEGs, the electrophilically activated PEGs, the sulfhydryi-selective PEGs, the heterofunctional PEGs, the biotin PEGs, the vinyl derivatives, the PEG silanes and the PEG phospholipids. In particular, suitable non-amino acid linking regions are the heterofunctional PEG, (X-PEG-Y) polymers from Shearwater such as PEG (NPC)2, PEG-(NH2)2, t-BOC-NH-PEG-NH2, t-BOC-NH-PEG-CO2NHS, OH-PEG-NH-tBOC, FMOC-NH-PEG-CO2NHS or PEG$(NPC)_2$ MW 3400 from Sigma, glutaric dialdehyde 50 wt % solution in water from Aldrich, disuccinimidyl suberate (DSS) form Sigma, γ-maleimidobutyric acid N-hydroxysuccinimide ester (GMBS) from Sigma, 1-ethyl-3-(3-dimethylaminopropyl)carbodiimide hydrochloride (EDC) from Sigma and dimethyl suberimidate hydrochloride (DMS) from Sigma.

2) Other suitable non-amino acid linking regions are 1-ethyl-3-(3-dimethylaminopropyl) carbodiimide, N-ethyl-5-phenylisoaxolium-3-sulphonate, 1-cyclohexyl-3 (2morpholinoethyl) carbodide metho-p-toluene sulphonate, N-ethoxycarbonyl-2-ethoxy 1,2, dihydroquinoline or glutaraldehyde.

3) Also suitable are the crosslinkers described in the 1999/2000 Pierce Products Catalogue from the Pierce Company, under the heading "Cross linking reagents: the SMPH, SMCC, LC-SMCC compounds, and preferably the Sulfo-KMUS compound.

Preferred chemical linking regions are PEG(NPC)2, (NH2)2-PEG, t-BOC-NH-PEG-NH2, MAL-PEG-NHS, VS-PEG-NHS polymers from Shearwater and/or the Sulfo-KMUS compound from Pierce.

Detergent Components

The laundry detergent and/or fabric care compositions of the invention must contain at least one additional detergent and/or fabric care components. The precise nature of these additional components, and levels of incorporation thereof will depend on the physical form of the composition, and the nature of the cleaning operation for which it is to be used.

The laundry detergent and/or fabric care compositions of the present invention preferably further comprise a detergent ingredient selected from cationic, anionic and/or nonionic surfactants and/or bleaching agent.

The laundry detergent and/or fabric care compositions according to the invention can be liquid, paste, gels, bars, tablets, spray, foam, powder or granular forms. Granular compositions can also be in "compact" form, the liquid compositions can also be in a "concentrated" form.

The compositions of the invention may for example, be formulated as hand and machine laundry detergent compositions including laundry additive compositions and compositions suitable for use in the soaking and/or pretreatment of stained fabrics, rinse added fabric softener compositions. Pre-or post treatment of fabric include gel, spray and liquid fabric care compositions. A rinse cycle with or without the presence of softening agents is also contemplated.

When formulated as compositions suitable for use in a laundry machine washing method, the compositions of the invention preferably contain both a surfactant and a builder compound and additionally one or more detergent components preferably selected from organic polymeric compounds, bleaching agents, additional enzymes, suds suppressors, dispersants, lime-soap dispersants, soil suspension and anti-redeposition agents and corrosion inhibitors. Laundry compositions can also contain softening agents, as additional detergent components.

The compositions of the invention can also be used as detergent additive products in solid or liquid form. Such additive products are intended to supplement or boost the performance of conventional detergent compositions and can be added at any stage of the cleaning process.

If needed the density of the laundry detergent compositions herein ranges from 400 to 1200 g/litre, preferably 500 to 950 g/litre of composition measured at 20° C.

The "compact" form of the compositions herein is best reflected by density and, in terms of composition, by the amount of inorganic filler salt; inorganic filler salts are conventional ingredients of detergent compositions in powder form; in conventional detergent compositions, the filler salts are present in substantial amounts, typically 17–35% by weight of the total composition. In the compact compositions, the filler salt is present in amounts not exceeding 15% of the total composition, preferably not exceeding 10%, most preferably not exceeding 5% by weight of the composition. The inorganic filler salts, such as meant in the present compositions are selected from the alkali and alkaline-earth-metal salts of sulphates and chlorides. A preferred filler salt is sodium sulphate.

Liquid laundry detergent and/or fabric care compositions according to the present invention can also be in a "concentrated form", in such case, the liquid laundry detergent and/or fabric care compositions according the present invention will contain a lower amount of water, compared to conventional liquid detergents. Typically the water content of the concentrated liquid detergent is preferably less than 40%, more preferably less than 30%, most preferably less than 20% by weight of the detergent composition.

Surfactant System

The laundry detergent and/or fabric care compositions according to the present invention preferably comprise a surfactant system wherein the surfactant can be selected from cationic, nonionic and/or anionic surfactants. It has been surprisingly found that the laundry detergent and/or fabric care compositions of the present invention further comprising a cationic, anionic and/or nonionic surfactant provide improved sanitisation and improved cleaning/whitening benefits.

The surfactant is typically present at a level of from 0.1% to 60% by weight. More preferred levels of incorporation are 1% to 35% by weight, most preferably from 1% to 30% by weight of laundry detergent and/or fabric care compositions in accord with the invention.

The surfactant is preferably formulated to be compatible with enzyme components present in the composition. In liquid or gel compositions the surfactant is most preferably formulated such that it promotes, or at least does not degrade, the stability of any enzyme in these compositions.

Cationic detersive surfactants suitable for use in the laundry detergent and/or fabric care compositions of the present invention are those having one long-chain hydrocarbyl group. Examples of such cationic surfactants include the ammonium surfactants such as alkyltrimethylammonium halogenides, and those surfactants having the formula:

$$[R^2(OR^3)_y][R^4(OR^3)_y]_2R^5N+X-$$

wherein $R^2$ is an alkyl or alkyl benzyl group having from about 8 to about 18 carbon atoms in the alkyl chain, each $R^3$ is selected from the group consisting of $-CH_2CH_2-$, $-CH_2CH(CH_3)-$, $-CH_2CH(CH_2OH)-$, $-CH_2CH_2CH_2-$, and mixtures thereof; each $R^4$ is selected from the group consisting of $C_1$–$C_4$ alkyl, $C_1$–$C_4$ hydroxyalkyl, benzyl ring structures formed by joining the two $R^4$ groups, $-CH_2CHOH-CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Quaternary ammonium surfactant suitable for the present invention has the formula (I):

Formula I

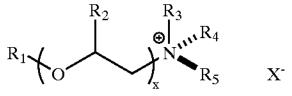

whereby R1 is a short chainlength alkyl (C6–C10) or alkylamidoalkyl of the Formula II:

Formula II

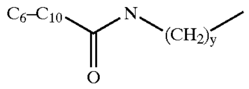

y is 2–4, preferably 3.

whereby R2 is H or a C1–C3 alkyl, whereby x is 0–4, preferably 0–2, most preferably 0, whereby R3, R4 and R5 are either the same or different and can be either a short chain alkyl (C1–C3) or alkoxylated alkyl of the formula III, whereby $X^-$ is a counterion, preferably a halide, e.g. chloride or methylsulfate.

Formula III

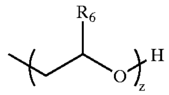

R6 is $C_1$–$C_4$ and z is 1 or 2.

Preferred quat ammonium surfactants are those as defined in formula I whereby $R_1$ is $C_8$, $C_{10}$ or mixtures thereof, x=o, $R_3$, $R_4$=$CH_3$ and $R_5$=$CH_2CH_2OH$.

Highly preferred cationic surfactants are the water-soluble quaternary ammonium compounds useful in the present composition having the formula:

$$R_1R_2R_3R_4N^+X^- \qquad (i)$$

wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and $-(C_2H_{40})_xH$ where x has a value from 2 to 5, and X is an anion. Not more than one of $R_2$, $R_3$ or $R_4$ should be benzyl.

The preferred alkyl chain length for $R_1$ is $C_{12}$–$C_{15}$ particularly where the alkyl group is a mixture of chain lengths derived from coconut or palm kernel fat or is derived synthetically by olefin build up or OXO alcohols synthesis. Preferred groups for $R_2R_3$ and $R_4$ are methyl and hydroxyethyl groups and the anion X may be selected from halide, methosulphate, acetate and phosphate ions. Examples of suitable quaternary ammonium compounds of formulae (i) for use herein are:

coconut trimethyl ammonium chloride or bromide;

coconut methyl dihydroxyethyl ammonium chloride or bromide;

decyl triethyl ammonium chloride;

decyl dimethyl hydroxyethyl ammonium chloride or bromide;

$C_{12-15}$ dimethyl hydroxyethyl ammonium chloride or bromide;

coconut dimethyl hydroxyethyl ammonium chloride or bromide;

myristyl trimethyl ammonium methyl sulphate;

lauryl dimethyl benzyl ammonium chloride or bromide;

lauryl dimethyl $(ethenoxy)_4$ ammonium chloride or bromide;

choline esters (compounds of formula (i) wherein $R_1$ is

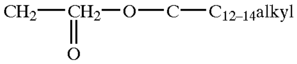
and $R_2R_3R_4$ are methyl di-alkyl imidazolines [compounds of formula (i)].

Other cationic surfactants useful herein are also described in U.S. Pat. No. 4,228,044, Cambre, issued Oct. 14, 1980 and in European Patent Application EP 000,224.

Polyethylene, polypropylene, and polybutylene oxide condensates of alkyl phenols are suitable for use as the nonionic surfactant of the surfactant systems of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight-chain or branched-chain configuration with the alkylene oxide. In a preferred embodiment, the ethylene oxide is present in an amount equal to from about 2 to about 25 moles, more preferably from about 3 to about 15 moles, of ethylene oxide per mole of alkyl phenol. Commercially available nonionic surfactants of this type include Igepal™ CO-630, marketed by the GAF Corporation; and Triton™ X45, X-114, X-100 and X-102, all marketed by the Rohm & Haas Company. These surfactants are commonly referred to as alkylphenol alkoxylates (e.g., alkyl phenol ethoxylates).

The condensation products of primary and secondary aliphatic alcohols with from about 1 to about 25 moles of ethylene oxide are suitable for use as the nonionic surfactant of the nonionic surfactant systems of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. About 2 to about 7 moles of ethylene oxide and most preferably from 2 to 5 moles of ethylene oxide per mole of alcohol are present in said condensation products. Examples of commercially available nonionic surfactants of this type include Tergitol™ 15-S-9 (the condensation product of $C_{11}$–$C_1$ 5 linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45-9 (the condensation product of $C_{14}$–$C_{15}$ linear alcohol with 9 moles of ethylene oxide), Neodol™ 23–3 (the condensation product of $C_{12}$–$C_{13}$ linear alcohol with 3.0 moles of ethylene oxide), Neodol™ 45-7 (the condensation product of $C_{14}$–$C_{15}$ linear alcohol with 7 moles of ethylene oxide), Neodol™ 45-5 (the condensation product of $C_{14}$–$C_{15}$ linear alcohol with 5 moles of ethylene oxide) marketed by Shell Chemical Company, Kyro™ EOB (the condensation product of $C_{13}$–$C_{15}$ alcohol with 9 moles ethylene oxide), marketed by The Procter & Gamble Company, and Genapol LA O3O or O5O (the condensation product of $C_{12}$–$C_{14}$ alcohol with 3 or 5 moles of ethylene oxide) marketed by Hoechst. Preferred range of HLB in these products is from 8–11 and most preferred from 8–10.

Also useful as the nonionic surfactant of the surfactant systems of the present invention are the alkylpolysaccharides disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g. a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties (optionally the hydrophobic group is attached at the 2-, 3-, 4-, etc. positions thus giving a glucose or galactose as opposed to a glucoside or galactoside). The intersaccharide bonds can be, e.g., between the one position of the additional saccharide units and the 2-, 3-, 4-, and/or 6-positions on the preceding saccharide units.

The preferred alkylpolyglycosides have the formula $$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

The condensation products of ethylene oxide with a hydrophobic base formed by the condensation of propylene oxide with propylene glycol are also suitable for use as the additional nonionic surfactant systems of the present invention. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially-available Plurafac™ LF404 and Pluronic™ surfactants, marketed by BASF.

Also suitable for use as the nonionic surfactant of the nonionic surfactant system of the present invention, are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic™ compounds, marketed by BASF.

Preferred for use as the nonionic surfactant of the surfactant systems of the present invention are polyethylene oxide condensates of alkyl phenols, condensation products of primary and secondary aliphatic alcohols with from about 1 to about 25 moles of ethylene oxide, alkylpolysaccharides, and mixtures thereof. Most preferred are $C_8$–$C_{14}$ alkyl phenol ethoxylates having from 3 to 15 ethoxy groups and $C_8$–$C_{18}$ alcohol ethoxylates (preferably $C_{10}$ avg.) having from 2 to 10 ethoxy groups, and mixtures thereof.

Highly preferred nonionic surfactants are polyhydroxy fatty acid amide surfactants of the formula.

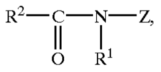

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or $C_{16-18}$ alkyl or alkenyl chain such as coconut alkyl or mixtures thereof, and Z is derived from a reducing sugar such as glucose, fructose, maltose, lactose, in a reductive amination reaction.

Suitable anionic surfactants to be used are linear alkyl benzene sulfonate, alkyl ester sulfonate surfactants including linear esters of $C_8$–$C_{20}$ carboxylic acids (i.e., fatty acids) which are sulfonated with gaseous $SO_3$ according to "The Journal of the American Oil Chemists Society", 52 (1975), pp. 323–329. Suitable starting materials would include natural fatty substances as derived from tallow, palm oil, etc.

The preferred alkyl ester sulfonate surfactant, especially for laundry applications, comprise alkyl ester sulfonate surfactants of the structural formula:

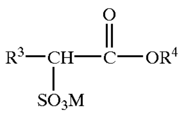

wherein $R^3$ is a $C_8$–$C_{20}$ hydrocarbyl, preferably an alkyl, or combination thereof, $R^4$ is a $C_1$–$C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl, and $R^4$ is methyl, ethyl or isopropyl. Especially preferred are the methyl ester sulfonates wherein $R^3$ is $C_{10}$–$C_{16}$ alkyl.

Other suitable anionic surfactants include the alkyl sulfate surfactants which are water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g. sodium, potassium, lithium), or ammonium or substituted ammonium (e.g. methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like). Typically, alkyl chains of $C_{12}$–$C_{16}$ are preferred for lower wash temperatures (e.g. below about 50° C.) and $C_{16-18}$ alkyl chains are preferred for higher wash temperatures (e.g. above about 50° C.).

Other anionic surfactants useful for detersive purposes can also be included in the laundry detergent and/or fabric care compositions of the present invention. These can include salts (including, for example, sodium, potassium, ammonium, and substituted ammonium salts such as mono-, di- and triethanolamine salts) of soap, $C_8$–$C_{22}$ primary of secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl glycerol sulfonates, fatty acyl glycerol sulfonates, fatty oleyl glycerol sulfates-, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}$–$C_{18}$ monoesters) and diesters of sulfosuccinates (especially saturated and unsaturated $C_6$–$C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula $RO(CH_2CH_2O)_k$—$CH_2COO$—M+ wherein R is a $C_8$–$C_{22}$ alkyl, k is an integer from 1 to 10, and M is a soluble salt-forming cation. Resin acids and hydrogenated resin acids are also suitable, such as rosin, hydrogenated rosin, and resin acids and hydrogenated resin acids present in or derived from tall oil.

Further examples are described in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

When included therein, the laundry laundry detergent and/or fabric care compositions of the present invention typically comprise from about 1% to about 40%, preferably from about 3% to about 20% by weight of such anionic surfactants.

Highly preferred anionic surfactants include alkyl alkoxylated sulfate surfactants hereof are water soluble salts or acids of the formula $RO(A)_mSO3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethyl-ammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are $C_{12}$–$C_{18}$ alkyl polyethoxylate (1.0) sulfate ($C_{12}$–$C_{18}E(1.0)M$), $C_{12}$–$C_{18}$ alkyl polyethoxylate (2.25) sulfate ($C_{12}$–$C_{18}E(2.25)M$), $C_{12}$–$C_{18}$ alkyl polyethoxylate (3.0) sulfate ($C_{12}$–$C_{18}E(3.0)M$), and $C_{12}$–$C_{18}$ alkyl polyethoxylate (4.0) sulfate ($C_{12}$–$C_{18}E(4.0)M$), wherein M is conveniently selected from sodium and potassium.

Bleaching Agent

The laundry detergent and/or fabric care compositions according to the present invention preferably comprise a bleaching agent. It has been surprisingly found that the laundry detergent and/or fabric care compositions of the present invention further comprising a bleaching agent provide improved sanitisation and cleaning/whitening and benefits.

Suitable bleaching agents are hydrogen peroxide, PB1, PB4 and percarbonate with a particle size of 400–800 microns. These bleaching agent components can include one or more oxygen bleaching agents and, depending upon the bleaching agent chosen, one or more bleach activators. When present oxygen bleaching compounds will typically be present at levels of from about 1% to about 25%.

The bleaching agent component for use herein can be any of the bleaching agents useful for laundry detergent and/or fabric care compositions including oxygen bleaches as well as others known in the art. The bleaching agent suitable for the present invention can be an activated or non-activated bleaching agent.

One category of oxygen bleaching agent that can be used encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino4-oxoperoxybutyric acid and diperoxydodecanedioic acid. Such bleaching agents are disclosed in U.S. Pat. No. 4,483,781, U.S. patent application Ser. No. 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

The hydrogen peroxide releasing agents can be used in combination with bleach activators such as tetraacetylethylenediamine (TAED), nonanoyloxybenzene-sulfonate (NOBS, described in U.S. Pat. No. 4,412,934), 3,5,-trimethylhexanoloxybenzenesulfonate (ISONOBS, described in EP 120,591) or pentaacetylglucose (PAG)or Phenolsulfonate ester of N-nonanoyl-6-aminocaproic acid (NACA-OBS, described in WO94/28106), which are perhydrolyzed to form a peracid as the active bleaching species, leading to improved bleaching effect. Also suitable activators are acylated citrate esters such as disclosed in Copending European Patent Application No. 91870207.7.

Useful bleaching agents, including peroxyacids and bleaching systems comprising bleach activators and peroxygen bleaching compounds for use in detergent compositions according to the invention are described in our co-pending applications U.S. Ser. No. 08/136,626, PCT/US95107823, WO95/27772, WO95/27773, WO95/27774 and WO95127775.

The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

Metal-containing catalysts for use in bleach compositions, include cobalt-containing catalysts such as Pentaamine acetate cobalt(III) salts and manganese-containing catalysts such as those described in EPA 549 271; EPA 549 272; EPA 458 397; U.S. Pat. No. 5,246,621; EPA 458 398; U.S. Pat. No. 5,194,416 and U.S. Pat. No. 5,114,611. Bleaching composition comprising a peroxy compound, a manganese-containing bleach catalyst and a chelating agent is described in the patent application No. 94870206.3.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent compositions will contain about 0.025% to about 1.25%, by weight, of sulfonated zinc phthalocyanine.

Other Surfactant System

The laundry detergent and/or fabric care compositions according to the present invention generally comprise a surfactant system wherein the surfactant can be selected from other cationic and/or ampholytic and/or zwitterionic and/or semi-polar surfactants.

The surfactant is typically present at a level of from 0.1% to 60% by weight. More preferred levels of incorporation are 1% to 35% by weight, most preferably from 1% to 30% by weight of laundry detergent and/or fabric care compositions in accord with the invention.

The surfactant is preferably formulated to be compatible with enzyme components present in the composition. In liquid or gel compositions the surfactant is most preferably formulated such that it promotes, or at least does not degrade, the stability of any enzyme in these compositions.

Typical cationic fabric softening components include the water-insoluble quaternary-ammonium fabric softening actives or the corresponding amine precursor, the most commonly used having been di-long alkyl chain ammonium chloride or methyl sulfate.

Preferred cationic softeners among these include the following:

1) ditallow dimethylammonium chloride (DTDMAC);
2) dihydrogenated tallow dimethylammonium chloride;
3) dihydrogenated tallow dimethylammonium methylsulfate;
4) distearyl dimethylammonium chloride;
5) dioleyl dimethylammonium chloride;
6) dipalmityl hydroxyethyl methylammonium chloride;
7) stearyl benzyl dimethylammonium chloride;
8) tallow trimethylammonium chloride;
9) hydrogenated tallow trimethylammonium chloride;
10) $C_{12-14}$ alkyl hydroxyethyl dimethylammonium chloride;
11) $C_{12-18}$ alkyl dihydroxyethyl methylammonium chloride;
12) di(stearoyloxyethyl) dimethylammonium chloride (DSOEDMAC);
13) di(tallow-oxy-ethyl) dimethylammonium chloride;
14) ditallow imidazolinium methylsulfate;
15) 1-(2-tallowylamidoethyl)-2-tallowyl imidazolinium methylsulfate.

Biodegradable quaternary ammonium compounds have been presented as alternatives to the traditionally used di-long alkyl chain ammonium chlorides and methyl sulfates. Such quaternary ammonium compounds contain long chain alk(en)yl groups interrupted by functional groups such as carboxy groups. Said materials and fabric softening compositions containing them are disclosed in numerous publications such as EP-A-0,040,562, and EP-A-0,239,910.

The quaternary ammonium compounds and amine precursors herein have the formula (I) or (II), below:

(I)

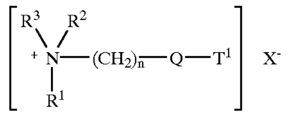

or (II)

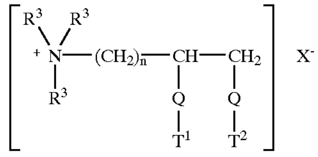

wherein Q is selected from —O—C(O)—, —C(O)—O—, —O—C(O)—O—, —$NR^4$—C(O)—, —C(O)—$NR^4$—;

$R^1$ is $(CH_2)_n$—Q—$T^2$ or $T^3$;

$R^2$ is $(CH_2)_m$—Q—$T^4$ or $T^5$ or $R^3$;

$R^3$ is $C_1$–$C_4$ alkyl or $C_1$–$C_4$ hydroxyalkyl or H;

$R^4$ is H or $C_1$–$C_4$ alkyl or $C_1$–$C_4$ hydroxyalkyl;

$T^1$, $T^2$, $T^3$, $T^4$, $T^5$ are independently $C_{11}$–$C_{22}$ alkyl or alkenyl;

n and m are integers from 1 to 4; and $X^{31}$ *is a softener-compatible anion.*

Non-limiting examples of softener-compatible anions include chloride or methyl sulfate.

The alkyl, or alkenyl, chain $T^1$, $T^2$, $T^3$, $T^4$, $T^5$ must contain at least 11 carbon atoms, preferably at least 16 carbon atoms. The chain may be straight or branched.

Tallow is a convenient and inexpensive source of long chain alkyl and alkenyl material. The compounds wherein $T^1$, $T^2$, $T^3$, $T^4$, $T^5$ represents the mixture of long chain materials typical for tallow are particularly preferred.

Specific examples of quaternary ammonium compounds suitable for use in the aqueous fabric softening compositions herein include:

1) N,N-di(tallowyl-oxy-ethyl)-N ,N-dimethyl ammonium chloride;
2) N,N-di(tallowyl-oxy-ethyl)-N-methyl, N-(2-hydroxyethyl) ammonium methyl sulfate;
3) N,N-di(2-tallowyl-oxy-2-oxo-ethyl)-N,N-dimethyl ammonium chloride;
4) N,N-di(2-tallowyl-oxy-ethylcarbonyl-oxy-ethyl)-N,N-dimethyl ammonium chloride;
5) N-(2-tallowyl-oxy-2-ethyl)-N-(2-tallowyl-oxy-2-oxo-ethyl)-N,N-dimethyl ammonium chloride;
6) N,N, N-tri(tallowyl-oxy-ethyl)-N-methyl ammonium chloride;
7) N-(2-tallowyl-oxy-2-oxo-ethyl)-N-(tallowyl-N,N-dimethyl-ammonium chloride; and
8) 1,2-ditallowyl-oxy-3-timethylammoniopropane chloride; and mixtures of any of the above materials.

When included therein, the laundry detergent and/or fabric care compositions of the present invention typically comprise from 0.2% to about 25%, preferably from about 1% to about 8% by weight of such cationic surfactants.

The laundry detergent and/or fabric care compositions of the present invention may also contain ampholytic, zwitterionic, and semi-polar surfactants.

Ampholytic surfactants are also suitable for use in the laundry detergent and/or fabric care compositions of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 to Laughlin et al., issued Dec. 30, 1975 at column 19, lines 18–35, for examples of ampholytic surfactants.

When included therein, the laundry detergent and/or fabric care compositions of the present invention typically comprise from 0.2% to about 15%, preferably from about 1% to about 10% by weight of such ampholytic surfactants.

Zwitterionic surfactants are also suitable for use in laundry detergent and/or fabric care compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants.

When included therein, the laundry detergent and/or fabric care compositions of the present invention typically comprise from 0.2% to about 15%, preferably from about 1% to about 10% by weight of such zwitterionic surfactants.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

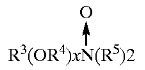

wherein $R^3$ is an alkyl, hydroxyalkyl, or alkyl phenyl group or mixtures therof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the cleaning compositions of the present invention typically comprise from 0.2% to about 15%, preferably from about 1% to about 10% by weight of such semi-polar nonionic surfactants.

The laundry detergent and/or fabric care composition of the present invention may further comprise a cosurfactant selected from the group of primary or tertiary amines. Suitable primary amines for use herein include amines according to the formula $R_1NH_2$ wherein $R_1$ is a $C_6$–$C_{12}$, preferably $C_6$–$C_{10}$ alkyl chain or $R_4X(CH_2)_n$, X is —O—,—C(O)NH— or —NH— $R_4$ is a $C_6$–$C_{12}$ alkyl chain n is between 1 to 5, preferably 3. $R_1$ alkyl chains may be straight or branched and may be interrupted with up to 12, preferably less than 5 ethylene oxide moieties. Preferred amines according to the formula herein above are n-alkyl amines. Suitable amines for use herein may be selected from 1-hexylamine, 1-octylamine, 1-decylamine and laurylamine. Other preferred primary amines include C8–C10 oxypropylamine, octyloxypropylamine, 2-ethylhexyl-oxypropylamine, lauryl amido propylamine and amido propylamine.

Suitable tertiary amines for use herein include tertiary amines having the formula $R_1R_2R_3N$ wherein R1 and R2 are $C_1$–$C_8$ alkylchains or

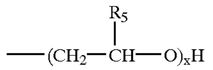

$R_3$ is either a $C_6$–$C_{12}$, preferably $C_6$–$C_{10}$ alkyl chain, or $R_3$ is $R_4X(CH_2)_n$, whereby X is —O—, —C(O)NH— or —NH—, $R_4$ is a $C_4$–$C_{12}$, n is between 1 to 5, preferably 2–3. $R_5$ is H or $C_1$–$C_2$ alkyl and x is between 1 to 6. $R_3$ and $R_4$ may be linear or branched ; $R_3$ alkyl chains may be interrupted with up to 12, preferably less than 5, ethylene oxide moieties.

Preferred tertiary amines are $R_1R_2R_3N$ where R1 is a C6–C12 alkyl chain, R2 and R3 are C1–C3 alkyl or

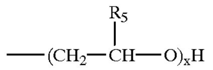

where R5 is H or CH3 and x=1–2.

Also preferred are the amidoamines of the formula:

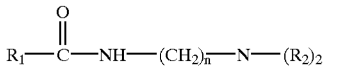

wherein $R_1$ is $C_6$–$C_{12}$ alkyl; n is 2–4, preferably n is 3; $R_2$ and $R_3$ is $C_1$–$C_4$.

Most preferred amines of the present invention include 1-octylamine, 1-hexylamine, 1-decylamine, 1-dodecylamine, C8–10 oxypropylamine, N coco 1–3 diaminopropane, coconutalkyldimethylamine, lauryldimethylamine, lauryl bis(hydroxyethyl)amine, coco bis(hydroxyehtyl)amine, lauryl amine 2 moles propoxylated, octyl amine 2 moles propoxylated, lauryl amidopropyldimethylamine, C8–10 amidopropyldimethylamine and C10 amidopropyldimethylamine. The most preferred amines for use in the compositions herein are 1-hexylamine, 1-octylamine, 1-decylamine, 1-dodecylamine. Especially desirable are n-dodecyldimethylamine and bishydroxyethylcoconutalkylamine and oleylamine 7 times ethoxylated, lauryl amido propylamine and cocoamido propylamine.

Conventional Detergent Enzymes

In addition to the modified enzymes of the present invention, the laundry detergent and/or fabric care compositions may further one or more enzymes which provide cleaning performance, fabric care and/or sanitisation benefits.

Said enzymes include enzymes selected from cellulases, hemicellulases, peroxidases, proteases, gluco-amylases, amylases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase or mixtures thereof.

A preferred combination is a laundry detergent and/or fabric care composition having cocktail of conventional applicable enzymes like protease, amylase, lipase, cutinase and/or cellulase in conjunction with one or more plant cell wall degrading enzymes.

The cellulases usable in the present invention include both bacterial or fungal cellulases. Preferably, they will have a pH optimum of between 5 and 12 and a specific activity above 50 CEVU/mg (Cellulose Viscosity Unit). Suitable cellulases are disclosed in U.S. Pat. No. 4,435,307, Barbesgoard et al, J61078384 and WO96/02653 which discloses fungal cellulase produced respectively from Humicola insolens, Trichoderma, Thielavia and Sporotrichum. EP 739 982 describes cellulases isolated from novel Bacillus species. Suitable cellulases are also disclosed in GB-A-2.075.028; GB-A-2.095.275; DE-OS-2.247.832 and WO95/26398.

Examples of such cellulases are cellulases produced by a strain of Humicola insolens (Humicola grisea var. thermoidea), particularly the Humicola strain DSM 1800.

Other suitable cellulases are cellulases originated from Humicola insolens having a molecular weight of about 50 KDa, an isoelectric point of 5.5 and containing 415 amino acids; and a ˜43 kD endoglucanase derived from Humicola insolens, DSM 1800, exhibiting cellulase activity; a preferred endoglucanase component has the amino acid sequence disclosed in PCT Patent Application No. WO 91/17243. Also suitable cellulases are the EGIII cellulases from Trichoderma longibrachiatum described in WO94121801, Genencor, published Sep. 29, 1994. Especially suitable cellulases are the cellulases having color care benefits. Examples of such cellulases are cellulases described in European patent application No. 91202879.2, filed Nov. 6, 1991 (Novo). Carezyme and Celluzyme (Novo Nordisk A/S) are especially useful. See also WO91/17244 and WO91/21801. Other suitable cellulases for fabric care and/or cleaning properties are described in WO96/34092, WO96/17994 and WO95/24471.

Said cellulases are normally incorporated in the laundry detergent and/or fabric care composition at levels from 0.0001% to 2% of pure enzyme by weight of the composition.

Peroxidase enzymes are used in combination with oxygen sources, e.g. percarbonate, perborate, persulfate, hydrogen peroxide, etc and with a phenolic substrate as bleach enhancing molecule. They are used for "solution bleaching", i.e. to prevent transfer of dyes or pigments removed from substrates during wash operations to other substrates in the wash solution. Peroxidase enzymes are known in the art, and include, for example, horseradish peroxidase, ligninase and haloperoxidase such as chloro- and bromo-peroxidase. Peroxidase-containing detergent compositions are disclosed, for example, in PCT International Application WO 89/099813, WO89/09813 and in European Patent application EP No. 91202882.6, filed on Nov. 6, 1991 and EP No. 96870013.8, filed Feb. 20,1996. Also suitable is the laccase enzyme. Enhancers are generally comprised at a level of from 0.1% to 5% by weight of total composition. Preferred enhancers are substituted phenthiazine and phenoxasine 10-Phenothiazinepropionicacid (PPT), 10-ethylphenothiazine-4-carboxylic acid (EPC), 10-phenoxazinepropionic acid (POP) and 10-methylphenoxazine (described in WO 94/12621) and substituted syringates (C3–C5 substituted alkyl syringates) and phenols. Sodium percarbonate or perborate are preferred sources of hydrogen peroxide.

Said peroxidases are normally incorporated in the laundry detergent and/or fabric care composition at levels from 0.0001% to 2% of pure enzyme by weight of the composition.

Other preferred enzymes that can be included in the laundry detergent and/or fabric care compositions of the present invention include lipases. Suitable lipase enzymes for detergent usage include those produced by microorganisms of the Pseudomonas group, such as *Pseudomonas stutzeri* ATCC 19.154, as disclosed in British Patent 1,372,034. Suitable lipases include those which show a positive immunological cross-reaction with the antibody of the lipase, produced by the microorganism *Pseudomonas fluorescent* IAM 1057. This lipase is available from Amano Pharmaceutical Co. Ltd., Nagoya, Japan, under the trade name Lipase P "Amano," hereinafter referred to as "Amano-P". Other suitable commercial lipases include Amano-CES, lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. Especially suitable lipases are lipases such as M1 Lipase$^R$ and Lipomax$^R$ (Gist-Brocades) and Lipolase$^R$ and Lipolase Ultra$^R$(Novo) which have found to be very effective when used in combination with the compositions of the present invention. Also suitables are the lipolytic enzymes described in EP 258 068, WO 92/05249 and WO 95/22615 by Novo Nordisk and in WO 94/03578, WO 95/35381 and WO 96/00292 by Unilever.

Also suitable are cutinases [EC 3.1.1.50] which can be considered as a special kind of lipase, namely lipases which do not require interfacial activation. Addition of cutinases to detergent compositions have been described in e.g. WO-A-88/09367 (Genencor); WO 90/09446 (Plant Genetic System) and WO 94/14963 and WO 94/14964 (Unilever).

The lipases and/or cutinases are normally incorporated in the laundry detergent and/or fabric care composition at levels from 0.0001% to 2% of pure enzyme by weight of the composition.

Suitable proteases are the subtilisins which are obtained from particular strains of *B. subtilis* and *B. licheniformis* (subtilisin BPN and BPN'). One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE®, DURAZYM® and SAVINASE® from Novo and MAXATASE®, MAXACAL®, PROPERASE® and MAXAPEM® (protein engineered Maxacal) from Gist-Brocades. Proteolytic enzymes also encompass modified bacterial serine proteases, such as those described in European Patent Application Serial Number 87 303761.8, filed Apr. 28,1987 (particularly pages 17, 24 and 98), and which is called herein "Protease B", and in European Patent Application 199,404, Venegas, published October 29, 1986, which refers to a modified bacterial serine protealytic enzyme which is called "Protease A" herein. Suitable is the protease called herein "Protease C", which is a variant of an alkaline serine protease from Bacillus in which lysine replaced arginine at position 27, tyrosine replaced valine at position 104, serine replaced asparagine at position 123, and alanine replaced threonine at position 274. Protease C is described in EP 90915958:4, corresponding to WO 91/06637, Published May 16, 1991. Genetically modified variants, particularly of Protease C, are also included herein.

A preferred protease referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens subtilisin*, as described in WO95/10591 and in the patent application of C. Ghosh, et al, "Bleaching Compositions Comprising Protease Enzymes" having U.S. Ser. No. 08/322,677, filed Oct. 13, 1994. Also suitable is a carbonyl hydrolase variant of the protease described in WO95/10591, having an amino acid sequence derived by replacement of a plurality of amino acid residues replaced in the precursor enzyme corresponding to position +210 in combination with one or more of the following residues : +33, +62, +67, +76, +100, +101, +103, +104, +107, +128, +129, +130, +132, +135, +156, +158, +164, +166, +167, +170, +209, +215, +217, +218, and +222, where the numbered position corresponds to naturally-occurring subtilisin from *Bacillus amyloliquefaciens* or to equivalent amino acid residues in other carbonyl hydrolases or subtilisins, such as *Bacillus lentus subtilisin* (co-pending patent application U.S. Ser. No. 60/048,550, filed Jun. 4, 1997).

Also preferred proteases are multiply-substituted protease variants. These protease variants comprise a substitution of an amino acid residue with another naturally occurring amino acid residue at an amino acid residue position corresponding to position 103 of *Bacillus amyloliquefaciens subtilisin* in combination with a substitution of an amino acid residue positions corresponding to positions 1, 3, 4, 8, 9, 10, 12, 13, 16, 17, 18, 19, 20, 21, 22, 24, 27, 33, 37, 38, 42, 43, 48, 55, 57, 58, 61, 62, 68, 72, 75, 76, 77, 78, 79, 86, 87, 89, 97, 98, 99, 101, 102, 104, 106, 107, 109, 111, 114, 116, 117, 119, 121, 123, 126, 128, 130, 131, 133,134, 137, 140, 141,142, 146,147, 158,159, 160,166,167, 170, 173, 174,177, 181,182, 183,184, 185, 188, 192, 194,198, 203, 204,205, 206, 209, 210, 211,212,213, 214, 215, 216, 217, 218, 222, 224, 227, 228, 230, 232, 236, 237, 238, 240, 242, 243, 244, 245, 246, 247, 248, 249, 251, 252, 253, 254, 255, 256, 257, 258, 259, 260, 261, 262, 263, 265, 268, 269, 270, 271, 272, 274 and 275 of *Bacillus amyloliquefaciens subtilisin*; wherein when said protease variant includes a substitution of amino acid residues at positions corresponding to positions 103 and 76, there is also a substitution of an amino acid residue at one or more amino acid residue positions other than amino acid residue positions corresponding to positions 27, 99, 101, 104, 107, 109, 123, 128, 166, 204, 206, 210, 216, 217, 218, 222, 260, 265 or 274 of *Bacillus amyloliquefaciens subtilisin* and/or multiply-substituted protease variants comprising a substitution of an amino acid residue with another naturally occurring amino acid residue at one or more amino acid residue positions corresponding to positions 62, 212, 230, 232, 252 and 257 of *Bacillus amyloliquefaciens subtilisin* as described in PCT application Nos. PCT/US98/22588, PCT/US98/22482 and PCT/US98/22486 all filed on Oct. 23, 1998 from The Procter & Gamble Company.

Also suitable for the present invention are proteases described in patent applications EP 251 446 and WO 91/06637, protease BLAP® described in WO91/02792 and their variants described in WO 95/23221.

See also a high pH protease from Bacillus sp. NCIMB 40338 described in WO 93/18140 A to Novo. Enzymatic detergents comprising protease, one or more other enzymes, and a reversible protease inhibitor are described in WO 92/03529 A to Novo. When desired, a protease having decreased adsorption and increased hydrolysis is available as described in WO 95107791 to Procter & Gamble. A recombinant trypsin-like protease for detergents suitable herein is described in WO 94125583 to Novo. Other suitable proteases are described in EP 516 200 by Unilever.

The proteolytic enzymes are incorporated in the laundry detergent and/or fabric care compositions of the present invention a level of from 0.0001% to 2%, preferably from 0.001% to 0.2%, more preferably from 0.005% to 0.1% pure enzyme by weight of the composition.

Amylases (α and/or β) can be included for removal of carbohydrate-based stains. WO94/02597, Novo Nordisk A/S published Feb. 3, 1994, describes cleaning compositions which incorporate mutant amylases. See also WO95/10603, Novo Nordisk A/S, published Apr. 20, 1995. Other amylases known for use in cleaning compositions include both α- and β-amylases. α-Amylases are known in the art and include those disclosed in U.S. Pat. No. 5,003,257; EP 252,666; WO/91/00353; FR 2,676,456; EP 285,123; EP 525,610; EP 368,341; and British Patent specification no. 1,296,839 (Novo). Other suitable amylases are stability-enhanced amylases described in WO94/18314, published Aug. 18, 1994 and WO96/05295, Genencor, published Feb. 22, 1996 and amylase variants having additional modification in the immediate parent available from Novo Nordisk A/S, disclosed in WO95/10603, published April 95. Also suitable are amylases described in EP 277 216, WO95126397 and WO96/23873 (all by Novo Nordisk).

Examples of commercial α-amylases products are Purafect Ox Am® from Genencor and Termamyl®, Ban® ,Fungamyl® and Duramyl(®, all available from Novo Nordisk A/S Denmark. WO95/26397 describes other suitable amylases: α-amylases characterised by having a specific activity at least 25% higher than the specific activity of Termamyl® at a temperature range of 25° C. to 55° C. and at a pH value in the range of 8 to 10, measured by the Phadebas® α-amylase activity assay. Suitable are variants of the above enzymes, described in WO96/23873 (Novo Nordisk). Other amylolytic enzymes with improved properties with respect to the activity level and the combination of thermostability and a higher activity level are described in WO95/35382.

The amylolytic enzymes are incorporated in the laundry detergent and/or fabric care compositions of the present invention a level of from 0.0001% to 2%, preferably from 0.00018% to 0.06%, more preferably from 0.00024% to 0.048% pure enzyme by weight of the composition.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Nowadays, it is common practice to modify wild-type enzymes via protein/genetic engineering techniques in order to optimise their performance efficiency in the laundry detergent and/or fabric care compositions of the invention. For example, the variants may be designed such that the compatibility of the enzyme to commonly encountered ingredients of such compositions is increased. Alternatively, the variant may be designed such that the optimal pH, bleach or chelant stability, catalytic activity and the like, of the enzyme variant is tailored to suit the particular cleaning application.

In particular, attention should be focused on amino acids sensitive to oxidation in the case of bleach stability and on surface charges for the surfactant compatibility. The isoelectric point of such enzymes may be modified by the substitution of some charged amino acids, e.g. an increase in isoelectric point may help to improve compatibility with anionic surfactants. The stability of the enzymes may be further enhanced by the creation of e.g. additional salt bridges and enforcing calcium binding sites to increase chelant stability. Special attention must be paid to the cellulases as most of the cellulases have separate binding domains (CBD). Properties of such enzymes can be altered by modifications in these domains.

Said enzymes are normally incorporated in the laundry detergent and/or fabric care composition at levels from 0.0001% to 2% of pure enzyme by weight of the composition. The enzymes can be added as separate single ingredients (prills, granulates, stabilized liquids, etc. containing one enzyme) or as mixtures of two or more enzymes (e.g. cogranulates).

Other suitable detergent ingredients that can be added are enzyme oxidation scavengers which are described in Copending European Patent application 92870018.6 filed on Jan. 31, 1992. Examples of such enzyme oxidation scavengers are ethoxylated tetraethylene polyamines.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18,1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilised by various techniques. Enzyme stabilisation techniques are disclosed and exemplified in U.S. Pat. No. 3,600,319, Aug. 17, 1971, Gedge et al, EP 199,405 and EP 200,586, Oct. 29, 1986, Venegas. Enzyme stabilisation systems are also described, for example, in U.S. Pat. No. 3,519,570. A useful Bacillus, sp. AC13 giving proteases, xylanases and cellulases, is described in WO 9401532 A to Novo.

Colour Care and Fabric Care Benefits

Technologies which provide a type of colour care benefit can also be included. Examples of these technologies are metallo catalysts for colour maintenance. Such metallo catalysts are described in copending European Patent Application No. 92870181.2. Dye fixing agents, polyolefin dispersion for anti-wrinkles and improved water absorbency, perfume and amino-functional polymer for colour care treatment and perfume substantivity are further examples of colour care/fabric care technologies and are described in the co-pending Patent Application No. 96870140.9, filed Nov. 07, 1996.

Fabric softening agents can also be incorporated into laundry detergent and/or fabric care compositions in accordance with the present invention. These agents may be inorganic or organic in type. Inorganic softening agents are exemplified by the smectite clays disclosed in GB-A-1 400 898 and in U.S. Pat. No. 5,019,292. Organic fabric softening agents include the water insoluble tertiary amines as disclosed in GB-Al 514 276 and EP-BO 011 340 and their combination with mono C12–C14 quaternary ammonium salts are disclosed in EP-B-0 026 527 and EP-B-0 026 528 and di-long-chain amides as disclosed in EP-B-0 242 919. Other useful organic ingredients of fabric softening systems include high molecular weight polyethylene oxide materials as disclosed in EP-A-0 299 575 and 0 313 146.

Levels of smectite clay are normally in the range from 2% to 20%, more preferably from 5% to 15% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight whilst the high molecular weight polyethylene oxide materials and the water soluble cationic materials are added at levels of from 0.1% to 2%, normally from 0.15% to 1.5% by weight. These materials are normally added to the spray dried portion of the composition, although in some instances it may be more convenient to add them as a dry mixed particulate, or spray them as molten liquid on to other solid components of the composition.

Builder System

The compositions according to the present invention may further comprise a builder system. Any conventional builder system is suitable for use herein including aluminosilicate materials, silicates, polycarboxylates, alkyl- or alkenylsuccinic acid and fatty acids, materials such as ethylenediamine tetraacetate, diethylene triamine pentamethyleneacetate, metal ion sequestrants such as aminopolyphosphonates, particularly ethylenediamine tetramethylene phosphonic acid and diethylene triamine pentamethylenephosphonic acid. Phosphate builders can also be used herein.

Suitable builders can be an inorganic ion exchange material, commonly an inorganic hydrated aluminosilicate material, more particularly a hydrated synthetic zeolite such as hydrated zeolite A, X, B, HS or MAP. Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydro-furan-cis,cis,cis-tetracarboxylates, 2,5-tetrahydro-furan-cis-dicarboxylates, 2,2,5,5-tetrahydrofuran-tetracarboxylates, 1,2,3,4,5,6-hexane-hexacarboxylates and and carboxymethyl derivatives of polyhydric alcohols such as sorbitol, mannitol and xylitol. Aromatic poly-carboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

Preferred builder systems for use in the present compositions include a mixture of a water-insoluble aluminosilicate builder such as zeolite A or of a layered silicate (SKS-6), and a water-soluble carboxylate chelating agent such as citric acid.

Preferred builder systems include a mixture of a water-insoluble aluminosilicate builder such as zeolite A, and a watersoluble carboxylate chelating agent such as citric acid. Preferred builder systems for use in liquid laundry detergent and/or fabric care compositions of the present invention are soaps and polycarboxylates.

Other builder materials that can form part of the builder system for use in granular compositions include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or copolymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 5% to 80% by weight of the composition preferably from 10% to 70% and most usually from 30% to 60% by weight.

Chelating Agents

The laundry detergent and/or fabric care compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraamine-hexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

The compositions herein may also contain water-soluble methyl glycine diacetic acid (MGDA) salts (or acid form) as a chelant or co-builder useful with, for example, insoluble builders such as zeolites, layered silicates and the like.

If utilized, these chelating agents will generally comprise from about 0.1% to about 15% by weight of the laundry detergent and/or fabric care compositions herein. More preferably, if utilized, the chelating agents will comprise from about 0.1% to about 3.0% by weight of such compositions.

Suds Suppressor

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components.

A preferred silicone suds controlling agent is disclosed in Bartollota et al. U.S. Pat. No. 3 933 672. Other particularly useful suds suppressors are the self-emulsifying silicone suds suppressors, described in German Patent Application DTOS 2 646 126 published Apr. 28, 1977. An example of such a compound is DC-544, commercially available from Dow Corning, which is a sitoxane-glycol copolymer. Especially preferred suds controlling agent are the suds suppressor system comprising a mixture of silicone oils and 2-alkyl-alcanols. Suitable 2-alkyl-alkanols are 2-butyl-octanol which are commercially available under the trade name Isofol 12 R.

Such suds suppressor system are described in Copending European Patent application N 92870174.7 filed Nov. 10, 1992.

Especially preferred silicone suds controlling agents are described in Copending European Patent application N°92201649.8. Said compositions can comprise a silicone/silica mixture in combination with fumed nonporous silica such as Aerosil$^R$.

The suds suppressors described above are normally employed at levels of from 0.001% to 2% by weight of the composition, preferably from 0.01% to 1% by weight.

Others

Other components such as soil-suspending agents, soil-release agents, optical brighteners, abrasives, bactericides, tarnish inhibitors, coloring agents, and/or encapsulated or non-encapsulated perfumes may be employed.

Especially suitable encapsulating materials are water soluble capsules which consist of a matrix of polysaccharide and polyhydroxy compounds such as described in GB 1,464,616.

Other suitable water soluble encapsulating materials comprise dextrins derived from ungelatinized starch acid-esters of substituted dicarboxylic acids such as described in U.S. Pat. No. 3,455,838. These acid-ester dextrins are,preferably, prepared from such starches as waxy maize, waxy sorghum, sago, tapioca and potato. Suitable examples of said encapsulating materials include N-Lok manufactured by National Starch. The N-Lok encapsulating material consists of a modified maize starch and glucose. The starch is modified by adding monofunctional substituted groups such as octenyl succinic acid anhydride.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium 4,4'-bis-(2-diethanolamino-4-anilino-s-triazin-6-ylamino)stilbene-2:2' disulphonate, disodium 4, -4'-bis-(2-morpholino-4-anilino-s-triazin-6-ylamino-stilbene-2:2'-disulphonate, disodium 4,4'-bis-(2,4-dianilino-s-triazin-6-ylamino)stilbene-2:2'-disulphonate, monosodium 4',4"-bis-(2,4-dianilino-s-tri-azin-6 ylamino) stilbene-2-sulphonate, disodium 4,4'-bis-(2-anilino-4-(N-methyl-N-2-hydroxyethylamino)-s-triazin-6-ylamino) stilbene-2,2'-disulphonate, di-sodium 4,4'-bis-(4-phenyl-2,1,3-triazol-2-yl)-stilbene-2,2'disulphonate, di-sodium 4,4'bis(2-anilino4-(1-methyl-2-hydroxyethylamino)-s-triazin-6-ylamino)stilbene-2,2'disulphonate, sodium 2(stilbyl-4"-(naphtho-1',2':4,5)-1,2,3-triazole-2"-sulphonate and 4,4'-bis(2-sulphostyryl)biphenyl. Highly preferred brighteners are the specific brighteners of copending European Patent application No. 95201943.8.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4711730 and European Published Patent Application No. 0 272 033. A particular preferred polymer in accordance with EP-A-0 272 033 has the formula $$(CH_3(PEG)_{43})_{0.75}(POH)_{0.25}[-PO)_{2.8}(T\text{-}PEG)_{0.4}]T(PO\text{-}H)_{0.25}((PEG)_{43}CH_3)_{0.75}$$

where PEG is —$(OC_2H_4)O$—,PO is $(OC_3H_6O)$ and T is $(pcOC_6H_4CO)$.

Also very useful are modified polyesters as random copolymers of dimethyl terephthalate, dimethyl sulfoisophthalate, ethylene glycol and 1–2 propane diol, the end groups consisting primarily of sulphobenzoate and secondarily of mono esters of ethylene glycol and/or propane-diol. The target is to obtain a polymer capped at both end by sulphobenzoate groups, "primarily", in the present context most of said copolymers herein will be end-capped by sulphobenzoate groups. However, some copolymers will be less than fully capped, and therefore their end groups may consist of monoester of ethylene glycol and/or propane 1–2 diol, thereof consist "secondarily" of such species.

The selected polyesters herein contain about 46% by weight of dimethyl terephthalic acid, about 16% by weight of propane −1.2 diol, about 10% by weight ethylene glycol about 13% by weight of dimethyl sulfobenzoic acid and about 15% by weight of sulfoisophthalic acid, and have a molecular weight of about 3.000. The polyesters and their method of preparation are described in detail in EPA 311 342.

It is well-known in the art that free chlorine in tap water rapidly deactivates the enzymes comprised in detergent compositions. Therefore, using chlorine scavenger such as perborate, ammonium sulfate, sodium sulphite or polyethyleneimine at a level above 0.1% by weight of total composition, in the formulas will provide improved through the wash stability of the detergent enzymes. Compositions comprising chlorine scavenger are described in the European patent application 92870018.6 filed Jan. 31, 1992.

Alkoxylated polycarboxylates such as those prepared from polyacrylates are useful herein to provide additional grease removal performance. Such materials are described in WO 91/08281 and PCT 90/01815 at p. 4 et seq., incorporated herein by reference. Chemically, these materials comprise polyacrylates having one ethoxy side-chain per every 7–8 acrylate units. The side-chains are of the formula —$(CH_2CH_2O)_m(CH_2)_nCH_3$ wherein m is 2–3 and n is 6–12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Dispersants

The laundry detergent and/or fabric care composition of the present invention can also contain dispersants: Suitable water-soluble organic salts are the homo- or co-polymeric acids or their salts, in which the polycarboxylic acid comprises at least two carboxyl radicals separated from each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 1,000 to 100,000.

Especially, copolymer of acrylate and methylacrylate such as the 480N having a molecular weight of 4000, at a level from 0.5–20% by weight of composition can be added in the laundry detergent and/or fabric care compositions of the present invention.

The compositions of the invention may contain a lime soap peptiser compound, which has preferably a lime soap dispersing power (LSDP), as defined hereinafter of no more than 8, preferably no more than 7, most preferably no more than 6. The lime soap peptiser compound is preferably present at a level from 0% to 20% by weight.

A numerical measure of the effectiveness of a lime soap peptiser is given by the lime soap dispersant power (LSDP) which is determined using the lime soap dispersant test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant science Series, Volume 7, page 3; W. N. Linfield, Tenside surf. det., volume 27, pages 159–163, (1990); and M. K. Nagarajan, W. F. Masler, Cosmetics and Toiletries, volume 104, pages 71–73, (1989). The LSDP is the % weight ratio of dispersing agent to sodium oleate required to disperse the lime soap deposits formed by 0.025 g of sodium oleate in 30 ml of water of 333 ppm $CaCo_3$ (Ca:Mg=3:2) equivalent hardness.

Surfactants having good lime soap peptiser capability will include certain amine oxides, betaines, sulfobetaines, alkyl ethoxysulfates and ethoxylated alcohols. Exemplary surfactants having a LSDP of no more than 8 for use in accord with the present invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of amount 3 (LSDP=4), and the $C_{14}$–$C_{15}$ ethoxylated alcohols with an average degree of ethoxylation of either 12·(LSDP=6) or 30, sold under the tradenames Lutensol A012 and Lutensol A030 respectively, by BASF GmbH.

Polymeric lime soap peptisers suitable for use herein are described in the article by M. K. Nagarajan, W. F. Masler, to be found in Cosmetics and Toiletries, volume 104, pages 71–73, (1989).

Hydrophobic bleaches such as 4-[N-octanoyl-6-aminohexanoyl]benzene sulfonate, 4-[N-nonanoyl-6-aminohexanoyl]benzene sulfonate, 4-[N-decanoyl-6-aminohexanoyl]benzene sulfonate and mixtures thereof; and nonanoyloxy benzene sulfonate together with hydrophilic/hydrophobic bleach formulations can also be used as lime soap peptisers compounds.

Dye Transfer Inhibition

The laundry detergent and/or fabric care compositions of the present invention can also include compounds for inhibiting dye transfer from one fabric to another of solubilized and suspended dyes encountered during fabric laundering operations involving colored fabrics.

Polymeric Dye Transfer Inhibiting Agents

The laundry detergent and/or fabric care compositions according to the present invention may also comprise from 0.001% to 10%, preferably from 0.01% to 2%, more preferably from 0.05% to 1% by weight of polymeric dye transfer inhibiting agents. Said polymeric dye transfer inhibiting agents are normally incorporated into laundry detergent and/or fabric care compositions in order to inhibit the transfer of dyes from colored fabrics onto fabrics washed therewith. These polymers have the ability to complex or adsorb the fugitive dyes washed out of dyed fabrics before the dyes have the opportunity to become attached to other articles in the wash.

Especially suitable polymeric dye transfer inhibiting agents are polyamine N-oxide polymers, copolymers of N-vinylpyrrolidone and N-vinylimidazole, polyvinylpyrrolidone polymers, polyvinyloxazolidones and polyvinylimidazoles or mixtures thereof.

Addition of such polymers also enhances the performance of the enzymes according the invention.

a) Polyamine N-oxide Polymers

The polyamine N-oxide polymers suitable for use contain units having the following structure formula:

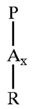

(I)

wherein

P is a polymerisable unit, whereto the R—N—O group can be attached to or wherein the R—N—O group forms part of the polymerisable unit or a combination of both.

A is 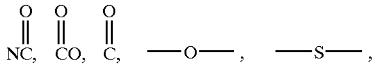 ; x is 0 or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

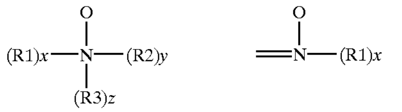

wherein

R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups.

The N—O group can be part of the polymerisable unit (P) or can be attached to the polymeric backbone or a combination of both. Suitable polyamine N-oxides wherein the N—O group forms part of the polymerisable unit comprise polyamine N-oxides wherein R is selected from aliphatic, aromatic, alicyclic or heterocyclic groups.

One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit.

Preferred class of these polyamine N-oxides are the polyamine N-oxides having the general formula (I) wherein R is an aromatic, heterocyclic or alicyclic groups wherein the nitrogen of the N—O functional group is part of said R group. Examples of these classes are polyamine oxides wherein R is a heterocyclic compound such as pyrridine, pyrrole, imidazole and derivatives thereof. Another preferred class of polyamine N-oxides are the polyamine oxides having the general formula (I) wherein R are aromatic, heterocyclic or alicyclic groups wherein the nitrogen of the N—O functional group is attached to said R groups. Examples of these classes are polyamine oxides wherein R groups can be aromatic such as phenyl.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof.

The amine N-oxide polymers of the present invention typically have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1:1000000. More preferably from 1:4 to 1:1000000, most preferably from 1:7 to 1:1000000. The polymers of the present invention actually encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine oxides can be obtained in almost any degree of polymerisation. The degree of polymerisation is not critical provided the material has the desired water-solubility and dye-suspending power.

Typically, the average molecular weight is within the range of 500 to 1000,000; preferably from 1,000 to 50,000, more preferably from 2,000 to 30,000, most preferably from 3,000 to 20,000.

b) Copolymers of N-vinylpyrrolidone and N-vinylimidazole

The N-vinylimidazole N-vinylpyrrolidone polymers used in the present invention have an average molecular weight range from 5,000–1,000,000, preferably from 5,000–200,000.

Highly preferred polymers for use in laundry detergent and/or fabric care compositions according to the present invention comprise a polymer selected from N-vinylimidazole N-vinylpyrrolidone copolymers wherein said polymer has an average molecular weight range from 5,000 to 50,000 more preferably from 8,000 to 30,000, most preferably from 10,000 to 20,000.

The average molecular weight range was determined by light scattering as described in Barth H. G. and Mays J. W. Chemical Analysis Vol 113, "Modern Methods of Polymer Characterization".

Highly preferred N-vinylimidazole N-vinylpyrrolidone copolymers have an average molecular weight range from 5,000 to 50,000; more preferably from 8,000 to 30,000; most preferably from 10,000 to 20,000.

The N-vinylimidazole N-vinylpyrrolidone copolymers characterized by having said average molecular weight range provide excellent dye transfer inhibiting properties while not adversely affecting the cleaning performance of laundry detergent and/or fabric care compositions formulated therewith.

The N-vinylimidazole N-vinylpyrrolidone copolymer of the present invention has a molar ratio of N-vinylimidazole to N-vinylpyrrolidone from 1 to 0.2, more preferably from 0.8 to 0.3, most preferably from 0.6 to 0.4.

c) Polyvinylpyrrolidone

The laundry detergent and/or fabric care compositions of the present invention may also utilize polyvinylpyrrolidone ("PVP") having an average molecular weight of from about 2,500 to about 400,000, preferably from about 5,000 to about 200,000, more preferably from about 5,000 to about 50,000, and most preferably from about 5,000 to about 15,000. Suitable polyvinylpyrrolidones are commercially vailable from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). Other suitable polyvinylpyrrolidones which are commercially available from BASF Cooperation include Sokalan HP 165 and Sokalan HP 12; polyvinylpyrrolidones known to persons skilled in the detergent field (see for example EP-A-262,897 and EP-A-256,696).

d) Polyvinyloxazolidone:

The laundry detergent and/or fabric care compositions of the present invention may also utilize polyvinyloxazolidone as a polymeric dye -transfer inhibiting agent. Said polyvinyloxazolidones have an average molecular weight of from about 2,500 to about 400,000, preferably from about 5,000 to about 200,000, more preferably from about 5,000 to about 50,000, and most preferably from about 5,000 to about 15,000.

e) Polyvinylimidazole:

The laundry detergent and/or fabric care compositions of the present invention may also utilize polyvinylimidazole as polymeric dye transfer inhibiting agent. Said polyvinylimidazoles have an average about 2,500 to about 400,000, preferably from about 5,000 to about 200,000, more preferably from about 5,000 to about 50,000, and most preferably from about 5,000 to about 15,000.

f) Cross-linked Polymers:

Cross-linked polymers are polymers whose backbone are interconnected to a certain degree; these links can be of chemical or physical nature, possibly with active groups n the backbone or on branches; cross-linked polymers have been described in the Journal of Polymer Science, volume 22, pages 1035–1039. In one embodiment, the cross-linked polymers are made in such a way that they form a three-dimensional rigid structure, which can entrap dyes in the pores formed by the three-dimensional structure. In another embodiment, the cross-linked polymers entrap the dyes by swelling.

Such cross-linked polymers are described in the co-pending patent application 94870213.9.

Method of Washing

The compositions of the invention may be used in essentially any washing, cleaning and/or fabric care methods, including soaking methods, pre-treatment methods, methods with rinsing steps for which a separate rinse aid composition may be added and post-treatment methods.

The process described herein comprises contacting fabrics with a laundering solution in the usual manner and exemplified hereunder. A conventional laundry method comprises treating soiled fabric with an aqueous liquid having dissolved or dispensed therein an effective amount of the laundry detergent and/or fabric care composition. The process of the invention is conveniently carried out in the course of the cleaning process. The method of cleaning is preferably carried out at 5° C. to 95° C., especially between 10° C. and 60° C. The pH of the treatment solution is preferably from 7 to 12.

The following examples are meant to exemplify compositions of the present invention, but are not necessarily meant to limit or otherwise define the scope of the invention. In the laundry detergent and/or fabric care compositions, the enzymes levels are expressed by pure enzyme by weight of the total composition and unless otherwise specified, the detergent ingredients are expressed by weight of the total compositions. The abbreviated component identifications therein have the following meanings:

LAS: Sodium linear $C_{11-13}$ alkyl benzene sulphonate.

TAS: Sodium tallow alkyl sulphate.

CxyAS: Sodium $C_{1x}$–$C_{1y}$ alkyl sulfate.

CxySAS: Sodium $C_{1x}$–$C_{1y}$ secondary (2,3) alkyl sulfate.

CxyEz: $C_{1x}$–$C_{1y}$ predominantly linear primary alcohol condensed with an average of z moles of ethylene oxide.

CxyEzS: $C_{1x}$–$C_{1y}$ sodium alkyl sulfate condensed with an average of z moles of ethylene oxide.

QAS: $R_2.N+(CH_3)_2(C_2H_4OH)$ with $R_2$=$C_{12}$–$C_{14}$.

QAS 1: $R_2.N+(CH_3)_2(C_2H_4OH)$ with $R_2$=$C_8$–$C_{11}$.

APA: $C_8$–$C_{10}$ amido propyl dimethyl amine.

Soap: Sodium linear alkyl carboxylate derived from a 80/20 mixture of tallow and coconut fatty acids.

STS: Sodium toluene sulphonate.

CFAA: $C_{12}$–$C_{14}$ alkyl N-methyl glucamide.

TFAA: $C_{16}$–$C_{18}$ alkyl N-methyl glucamide.

TPKFA: $C_{12}$–$C_{14}$ topped whole cut fatty acids.

DEQA: Di-(tallow-oxy-ethyl) dimethyl ammonium chloride.

DEQA (2): Di-(soft-tallowyloxyethyl) hydroxyethyl methyl ammonium methylsulfate.

DTDMAMS: Ditallow dimethyl ammonium methylsulfate.

SDASA: 1:2 ratio of stearyidimethyl amine:triple-pressed stearic acid.

Silicate: Amorphous Sodium Silicate ($SiO_2$:$Na_2O$ ratio=1.6–3.2).

Zeolite A: Hydrated Sodium Aluminosilicate of formula $Na_{12}(A1O_2SiO_2)_{12}$. $27H_2O$ having a primary particle size in the range from 0.1 to 10 micrometers (Weight expressed on an anhydrous basis).

Na-SKS-6: Crystalline layered silicate of formula $\delta$-$Na_2Si_2O_5$.

Citrate: Tri-sodium citrate dihydrate of activity 86.4% with a particle size distribution between 425 and 850 micrometres.

Citric: Anhydrous citric acid.

Borate: Sodium borate

Carbonate: Anhydrous sodium carbonate with a particle size between 200 and 900 micrometres.

Bicarbonate: Anhydrous sodium hydrogen carbonate with a particle size distribution between 400 and 1200 micrometres.

Sulphate: Anhydrous sodium sulphate.

Mg Sulphate: Anhydrous magnesium sulfate.

STPP: Sodium tripolyphosphate.

TSPP: Tetrasodium pyrophosphate.

MA/AA: Random copolymer of 4:1 acrylate/maleate, average molecular weight about 70,000–80,000.

MA/AA 1: Random copolymer of 6:4 acrylate/maleate, average molecular weight about 10,000.

AA: Sodium polyacrylate polymer of average molecular weight 4,500.

PB1: Anhydrous sodium perborate monohydrate of nominal formula $NaBO_2.H_2O_2$.

PB4: Sodium perborate tetrahydrate of nominal formula $NaBO_2.3H_2O.H_2O_2$.

Percarbonate: Anhydrous sodium percarbonate of nominal formula $2Na_2CO_3.3H_2O_2$.

TAED: Tetraacetylethylenediamine.

NOBS: Nonanoyloxybenzene sulfonate in the form of the sodium salt.

NACA-OBS: (6-nonamidocaproyl) oxybenzene sulfonate.

DTPA: Diethylene triamine pentaacetic acid.

HEDP: 1,1-hydroxyethane diphosphonic acid.

DETPMP: Diethyltriamine penta (methylene) phosphonate, marketed by Monsanto under the Trade name Dequest 2060.

EDDS: Ethylenediamine-N,N'-disuccinic acid, (S,S) isomer in the form of its sodium salt Photoactivated Bleach : Sulfonated zinc phtalocyanine encapsulated in dextrin soluble polymer.

Photoactivated Bleach 1: Sulfonated alumino phtalocyanine encapsulated in dextrin soluble polymer. Protease Proteolytic enzyme sold under the tradename Savinase, Alcalase, Durazym by Novo Nordisk A/S, Maxacal, Maxapem sold by Gist-Brocades and proteases described in patents WO91/06637 and/or WO95/10591.

Amylase: Amylolytic enzyme sold under the tradename Purafact Ox $Am^R$ described in WO 94/18314, WO96/05295 sold by Genencor; Termamyl®), Fungamyl® and Duramyl®, all available from Novo Nordisk A/S and those described in WO95/26397.

Lipase: Lipolytic enzyme sold under the tradename Lipolase, Lipolase Ultra by Novo Nordisk A/S and Lipomax by Gist-Brocades.

CBD-Dextranase: Dextranase enzyme sold by Fluka, linked by PEG(NPC)2 MW 3400 to the CBD cellulozome from *Clostridium cellulovorans*, sold under the tradename Cellulose Binding Domain by Sigma; and/or Dextranase enzyme sold by Fluka linked by the *Humicola Insolens family* 45 cellulase linker to the CBD of the cellulytic enzyme sold under the tradename Carezyme by Novo Nordisk A/S.

CBD-Hexosaminidase: N-acetyl-β-D-glucosaminidase sold by Boehringer Mannheim, linked by PEG(NPC)2 MW 3400 to the CBD cellulozome from *Clostndium cellulovorans*, sold under the tradename Cellulose Binding Domain by Sigma.

CBD-Protocatechuate: Protocatechuate 3,4-dioxygenase (EC.1.13.11.3) sold by Sigma linked by PEG(NPC)2 MW 3400 to the CBD cellulozome from *Clostridium cellulovorans*, sold under the tradename Cellulose Binding Domain by Sigma.

CBD-Protamine: Protoamine from Sigma linked by PEG (NPC)2 MW 3400 to the CBD cellulozome from *Clostridium cellulovorans*, sold under the tradename Cellulose Binding Domain by Sigma; and/or Protoamine from Sigma linked directly to the CBD of the E4 dual CBD system of *Thennomonospora fusca.*

CBD-Cecropin: Cecropin B from Sigma linked by PEG (NPC)2 MW 3400 to the CBD cellulozome from *Clostridium cellulovorans*, sold under the tradename Cellulose Binding Domain by Sigma.

CBD-Indolicidin: D-Indolicidin from Biosource technologies INC linked by PEG(NPC)2 MW 3400 to the CBD cellulozome from *Clostridium cellulovorans*, sold under the tradename Cellulose Binding Domain by Sigma.

Cellulase: Cellulytic enzyme sold under the tradename Carezyme, Celluzyme and/or Endolase by Novo Nordisk A/S.

CMC: Sodium carboxymethyl cellulose.

PVP: Polyvinyl polymer, with an average molecular weight of 60,000.

PVNO: Polyvinylpyridine-N-Oxide, with an average molecular weight of 50,000.

PVPVI: Copolymer of vinylimidazole and vinylpyrrolidone, with an average molecular weight of 20,000.

Brightener 1: Disodium 4,4'-bis(2-sulphostyryl)biphenyl.

Brightener 2: Disodium 4,4'-bis(4-anilino-6-morpholino-1.3.5-triazin-2-yl) stilbene-2:2'-disulfonate.

Silicone antifoam: Polydimethylsiloxane foam controller with siloxane-oxyalkylene copolymer as dispersing agent with a ratio of said foam controller to said dispersing agent of 10:1 to 100:1.

Suds Suppressor: 12% Silicone/silica, 18% stearyl alcohol, 70% starch in granular form.

Opacifier: Water based monostyrene latex mixture, sold by BASF Aktiengesellschaft under the tradename Lytron 621.

SRP 1: Anionically end capped poly esters.

SRP 2: Diethoxylated poly (1,2 propylene terephtalate) short block polymer.

QEA $bis((C2H_5O)(C_2H_4O)_n)(CH_3)—N^+–C_6H_{12}—N^+—(CH_3) bis((C2H_5O)—(C_2H_4O))_n$, wherein n=from 20 to 30.

PEI: Polyethyleneimine with an average molecular weight of 1800 and an average ethoxylation degree of 7 ethyleneoxy residues per nitrogen.

SCS: Sodium cumene sulphonate.

HMWPEO: High molecular weight polyethylene oxide.

PEGx: Polyethylene glycol, of a molecular weight of x.

PEO: Polyethylene oxide, with an average molecular weight of 5,000.

TEPAE: Tetreaethylenepentaamine ethoxylate.

EXAMPLE 1

The following high density laundry detergent compositions were prepared according to the present invention:

| | I | II | III | IV | V | VI |
|---|---|---|---|---|---|---|
| LAS | 8.0 | 8.0 | 8.0 | 2.0 | 6.0 | 6.0 |
| TAS | — | 0.5 | — | 0.5 | 1.0 | 0.1 |
| C46(S)AS | 2.0 | 2.5 | — | — | — | — |
| C25AS | — | — | — | 7.0 | 4.5 | 5.5 |
| C68AS | 2.0 | 5.0 | 7.0 | — | — | — |
| C25E5 | — | — | 3.4 | 10.0 | 4.6 | 4.6 |
| C25E7 | 3.4 | 3.4 | 1.0 | — | — | — |
| C25E35 | — | — | — | 2.0 | 5.0 | 4.5 |
| QAS | — | 0.8 | — | — | — | — |
| QAS 1 | — | — | — | 0.8 | 0.5 | 1.0 |
| Zeolite A | 18.1 | 18.0 | 14.1 | 18.1 | 20.0 | 18.1 |
| Citric | — | — | — | 2.5 | — | 2.5 |
| Carbonate | 13.0 | 13.0 | 27.0 | 10.0 | 10.0 | 13.0 |
| Na-SKS-6 | — | — | — | 10.0 | — | 10.0 |
| Silicate | 1.4 | 1.4 | 3.0 | 0.3 | 0.5 | 0.3 |
| Citrate | — | 1.0 | — | 3.0 | — | — |
| Sulfate | 26.1 | 26.1 | 26.1 | 6.0 | — | — |
| Mg sulfate | 0.3 | — | — | 0.2 | — | 0.2 |
| MA/AA | 0.3 | 0.3 | 0.3 | 4.0 | 1.0 | 1.0 |
| CMC | 0.2 | 0.2 | 0.2 | 0.2 | 0.4 | 0.4 |
| PB4 | 9.0 | 9.0 | 5.0 | — | — | — |
| Percarbonate | — | — | — | — | 18.0 | 18.0 |

-continued

| | I | II | III | IV | V | VI |
|---|---|---|---|---|---|---|
| TAED | 1.5 | 0.4 | 1.5 | — | 3.9 | 4.2 |
| NACA-OBS | — | 2.0 | 1.0 | — | — | — |
| DETPMP | 0.25 | 0.25 | 0.25 | 0.25 | — | — |
| SRP 1 | — | — | — | 0.2 | — | 0.2 |
| EDDS | — | 0.25 | 0.4 | — | 0.5 | 0.5 |
| CFAA | — | 1.0 | — | 2.0 | — | — |
| HEDP | 0.3 | 0.3 | 0.3 | 0.3 | 0.4 | 0.4 |
| QEA | — | — | — | 0.2 | — | 0.5 |
| Protease | 0.009 | 0.009 | 0.01 | 0.04 | 0.05 | 0.03 |
| Amylase | 0.002 | 0.002 | 0.002 | 0.006 | 0.008 | 0.008 |
| Cellulase | 0.0007 | 0.0006 | 0.0007 | 0.0008 | 0.0007 | 0.001 |
| Lipase | 0.006 | — | — | 0.01 | 0.01 | 0.01 |
| CBD-Dextranase | 0.05 | 0.01 | — | — | — | — |
| CBD-Protocatechuate | — | 0.01 | 0.05 | 0.05 | — | 0.01 |
| CBD-Indolicidin | — | — | 0.01 | — | 0.05 | — |
| Photoactivated bleach (ppm) | 15 | 15 | 15 | — | 20 | 20 |
| PVNO/PVPVI | — | — | — | 0.1 | — | — |
| Brightener 1 | 0.09 | 0.09 | 0.09 | — | 0.09 | 0.09 |
| Perfume | 0.3 | 0.3 | 0.3 | 0.4 | 0.4 | 0.4 |
| Silicone antifoam | 0.5 | 0.5 | 0.5 | — | 0.3 | 0.3 |
| Density in g/litre | 850 | 850 | 850 | 850 | 850 | 850 |
| Miscellaneous and minors | | | Up to 100% | | | |

EXAMPLE 2

The following granular laundry detergent compositions of particular utility under European machine wash conditions were prepared according to the present

| | I | II | III | IV | V | VI |
|---|---|---|---|---|---|---|
| LAS | 5.5 | 7.5 | 5.0 | 5.0 | 6.0 | 7.0 |
| TAS | 1.25 | 1.9 | — | 0.8 | 0.4 | 0.3 |
| C24AS/C25A5 | — | 2.2 | 5.0 | 5.0 | 5.0 | 2.2 |
| C25E3S | — | 0.8 | 1.0 | 1.5 | 3.0 | 1.0 |
| C45E7 | 3.25 | — | — | — | — | 3.0 |
| TFM | — | — | 2.0 | — | — | — |
| C25E5 | — | 5.5 | — | — | — | — |
| QAS | 0.8 | — | — | — | — | — |
| QAS 1 | — | 0.7 | 1.0 | 0.5 | 1.0 | 0.7 |
| STPP | 19.7 | — | — | — | — | — |
| Zeolite A | — | 19.5 | 25.0 | 19.5 | 20.0 | 17.0 |
| NaSKS-6/citric acid (79:21) | — | 10.6 | — | 10.6 | — | — |
| Na-SKS-6 | — | — | 9.0 | — | 10.0 | 10.0 |
| Carbonate | 6.1 | 21.4 | 9.0 | 10.0 | 10.0 | 18.0 |
| Bicarbonate | — | 2.0 | 7.0 | 5.0 | — | 2.0 |
| Silicate | 6.8 | — | — | 0.3 | 0.5 | — |
| Citrate | — | — | 4.0 | 4.0 | — | — |
| Sulfate | 39.8 | — | — | 5.0 | — | 12.0 |
| Mg sulfate | — | — | 0.1 | 0.2 | 0.2 | — |
| MA/AA | 0.5 | 1.6 | 3.0 | 4.0 | 1.0 | 1.0 |
| CMC | 0.2 | 0.4 | 1.0 | 1.0 | 0.4 | 0.4 |
| PB4 | 5.0 | 12.7 | — | — | — | — |
| Percarbonate | — | — | — | — | 18.0 | 15.0 |
| TAED | 0.5 | 3.1 | — | — | 5.0 | — |
| NACA-OBS | 1.0 | 3.5 | — | — | — | 2.5 |
| DETPMP | 0.25 | 0.2 | 0.3 | 0.4 | — | 0.2 |
| HEDP | — | 0.3 | — | 0.3 | 0.3 | 0.3 |
| QEA | — | — | 1.0 | 1.0 | 1.0 | — |
| Protease | 0.009 | 0.03 | 0.03 | 0.05 | 0.05 | 0.02 |
| Lipase | 0.003 | 0.003 | 0.006 | 0.006 | 0.006 | 0.004 |
| Cellulase | 0.0006 | 0.0006 | 0.0005 | 0.0005 | 0.0007 | 0.0007 |
| Amylase | 0.002 | 0.002 | 0.006 | 0.006 | 0.01 | 0.003 |

-continued

| | I | II | III | IV | V | VI |
|---|---|---|---|---|---|---|
| CBD-Hexo-saminidase | — | — | 0.03 | 0.01 | 0.01 | 0.05 |
| CBD-Protocatechuate | 0.05 | — | — | — | — | 0.01 |
| CBD-Protamine | — | 0.08 | — | — | — | — |
| PVNO/PVPVI | — | — | 0.2 | 0.2 | — | — |
| PVP | 0.9 | 1.3 | — | — | — | 0.9 |
| SRP 1 | — | — | 0.2 | 0.2 | 0.2 | — |
| Photoactivated bleach (ppm) | 15 | 27 | — | — | 20 | 20 |
| Photoactivated bleach 1 (ppm) | 15 | — | — | — | — | — |
| Brightener 1 | 0.08 | 0.2 | — | — | 0.09 | 0.15 |
| Brightener 2 | — | 0.04 | — | — | — | — |
| Perfume | 0.3 | 0.5 | 0.4 | 0.3 | 0.4 | 0.3 |
| Silicone antifoam | 0.5 | 2.4 | 0.3 | 0.5 | 0.3 | 2.0 |
| Density in g/litre | 750 | 750 | 750 | 750 | 750 | 750 |
| Miscellaneous and minors | | | Up to 100% | | | |

EXAMPLE 3

The following detergent formulations of particular utility under European machine wash conditions were prepared according to the present invention:

| | I | II | III | IV |
|---|---|---|---|---|
| Blown Powder | | | | |
| LAS | 6.0 | 5.0 | 11.0 | 6.0 |
| TAS | 2.0 | — | — | 2.0 |
| Zeolite A | 24.0 | — | — | 20.0 |
| STPP | — | 27.0 | 24.0 | — |
| Sulfate | 4.0 | 6.0 | 13.0 | — |
| MA/AA | 1.0 | 4.0 | 6.0 | 2.0 |
| Silicate | 1.0 | 7.0 | 3.0 | 3.0 |
| CMC | 1.0 | 1.0 | 0.5 | 0.6 |
| Brightener 1 | 0.2 | 0.2 | 0.2 | 0.2 |
| Silicone antifoam | 1.0 | 1.0 | 1.0 | 0.3 |
| DETPMP | 0.4 | 0.4 | 0.2 | 0.4 |
| Spray On | | | | |
| Brightener | 0.02 | — | — | 0.02 |
| C45E7 | — | — | — | 5.0 |
| C45E2 | 2.5 | 2.5 | 2.0 | — |
| C45E3 | 2.6 | 2.5 | 2.0 | — |
| Perfume | 0.5 | 0.3 | 0.5 | 0.2 |
| Silicone antifoam | 0.3 | 0.3 | 0.3 | — |
| Dry additives | | | | |
| QEA | — | — | — | 1.0 |
| EDDS | 0.3 | — | — | — |
| Sulfate | 2.0 | 3.0 | 5.0 | 10.0 |
| Carbonate | 6.0 | 13.0 | 15.0 | 14.0 |
| Citric | 2.5 | — | — | 2.0 |
| QAS 1 | 0.5 | — | — | 0.5 |
| Na-SKS-6 | 10.0 | — | — | — |
| Percarbonate | 18.5 | — | — | — |
| PB4 | — | 18.0 | 10.0 | 21.5 |
| TAED | 2.0 | 2.0 | — | 2.0 |
| NACA-OBS | 3.0 | 2.0 | 4.0 | — |
| CBD-Hexosaminidase | 0.05 | 0.05 | 0.02 | 0.02 |
| CBD-Protamine | — | — | 0.02 | — |
| Cellulase | 0.0004 | 0.0006 | 0.0006 | 0.0008 |
| Protease | 0.03 | 0.03 | 0.03 | 0.03 |
| Lipase | 0.008 | 0.008 | 0.008 | 0.004 |
| Amylase | 0.003 | 0.003 | 0.003 | 0.006 |

-continued

| | I | II | III | IV |
|---|---|---|---|---|
| Brightener 1 | 0.05 | — | — | 0.05 |
| Miscellaneous and minors | Up to 100% | | | |

-continued

| | I | II | III | IV | V | VI |
|---|---|---|---|---|---|---|
| Miscellaneous and minors | Up to 100% | | | | | |

EXAMPLE 4

The following granular detergent formulations were prepared according to the present invention:

| | I | II | III | IV | V | VI |
|---|---|---|---|---|---|---|
| Blown Powder | | | | | | |
| LAS | 23.0 | 8.0 | 7.0 | 9.0 | 7.0 | 7.0 |
| TAS | — | — | — | — | 1.0 | — |
| C45AS | 6.0 | 6.0 | 5.0 | 8.0 | — | — |
| C45AES | — | 1.0 | 1.0 | 1.0 | — | — |
| C45E35 | — | — | — | — | 2.0 | 4.0 |
| Zeolite A | 10.0 | 18.0 | 14.0 | 12.0 | 10.0 | 10.0 |
| MA/AA | — | 0.5 | — | — | — | 2.0 |
| MA/AA 1 | 7.0 | — | — | — | — | — |
| AA | — | 3.0 | 3.0 | 2.0 | 3.0 | 3.0 |
| Sulfate | 5.0 | 6.3 | 14.3 | 11.0 | 15.0 | 19.3 |
| Silicate | 10.0 | 1.0 | 1.0 | 1.0 | 1.0 | 1.0 |
| Carbonate | 15.0 | 20.0 | 10.0 | 20.7 | 8.0 | 6.0 |
| PEG 4000 | 0.4 | 1.5 | 1.5 | 1.0 | 1.0 | 1.0 |
| DTPA | — | 0.9 | 0.5 | — | — | 0.5 |
| Brightener 2 | 0.3 | 0.2 | 0.3 | — | 0.1 | 0.3 |
| Spray On | | | | | | |
| C45E7 | — | 2.0 | — | — | 2.0 | 2.0 |
| C25E9 | 3.0 | — | — | — | — | — |
| C23E9 | — | — | 1.5 | 2.0 | — | 2.0 |
| Perfume | 0.3 | 0.3 | 0.3 | 2.0 | 0.3 | 0.3 |
| Agglomerates | | | | | | |
| C45AS | — | 5.0 | 5.0 | 2.0 | — | — |
| LAS | — | 2.0 | 2.0 | — | — | 2.0 |
| Zeolite A | — | 7.5 | 7.5 | 8.0 | — | 7.5 |
| Carbonate | — | 4.0 | 4.0 | 5.0 | — | 4.0 |
| PEG 4000 | — | 0.5 | 0.5 | — | — | 0.5 |
| Misc (Water etc.) | — | 2.0 | 2.0 | 2.0 | — | 2.0 |
| Dry additives | | | | | | |
| QAS | — | — | — | — | 1.0 | — |
| Citric | — | — | — | — | 2.0 | — |
| PB4 | — | — | — | — | 12.0 | 1.0 |
| PB1 | 4.0 | 1.0 | 3.0 | 2.0 | — | — |
| Percarbonate | — | — | — | — | 2.0 | 10.0 |
| Carbonate | — | 5.3 | 1.8 | — | 4.0 | 4.0 |
| NOBS | 4.0 | — | 6.0 | — | — | 0.6 |
| Methyl cellulose | 0.2 | — | — | — | — | — |
| Na-SKS-6 | 8.0 | — | — | — | — | — |
| STS | — | — | 2.0 | — | 1.0 | — |
| Culmene sulfonic acid | — | 1.0 | — | — | — | 2.0 |
| Protease | 0.02 | 0.02 | 0.02 | 0.01 | 0.02 | 0.02 |
| Lipase | 0.004 | — | 0.004 | — | 0.004 | 0.008 |
| Amylase | 0.003 | — | 0.002 | — | 0.003 | — |
| Cellulase | 0.0003 | 0.0005 | 0.0005 | 0.0007 | 0.0005 | 0.0008 |
| CBD-Dextranase | 0.05 | 0.001 | 0.05 | 0.03 | — | — |
| CBD-Cecropin | — | — | — | 0.001 | 0.01 | 0.03 |
| PVPVI | — | — | — | — | 0.5 | — |
| PVP | — | — | — | — | 0.5 | — |
| PVNO | — | — | 0.5 | 0.3 | — | — |
| QEA | — | — | — | — | 1.0 | — |
| SRP 1 | 0.2 | 0.5 | 0.3 | — | 0.2 | — |
| Silicone antifoam | 0.2 | 0.4 | 0.2 | 0.4 | 0.1 | — |
| Mg sulfate | — | — | 0.2 | — | 0.2 | — |

EXAMPLE 5

The following nil bleach-containing detergent compositions of particular use in the washing of coloured clothing were prepared according to the present invention:

| | I | II | III |
|---|---|---|---|
| Blown Powder | | | |
| Zeolite A | 15.0 | 15.0 | — |
| Sulfate | — | 5.0 | — |
| LAS | 3.0 | 3.0 | — |
| DETPMP | 0.4 | 0.5 | — |
| CMC | 0.4 | 0.4 | — |
| MA/AA | 4.0 | 4.0 | — |
| Agglomerates | | | |
| C45AS | — | — | 11.0 |
| LAS | 6.0 | 5.0 | — |
| TAS | 3.0 | 2.0 | — |
| Silicate | 4.0 | 4.0 | — |
| Zeolite A | 10.0 | 15.0 | 13.0 |
| CMC | — | — | 0.5 |
| MA/AA | — | — | 2.0 |
| Carbonate | 9.0 | 7.0 | 7.0 |
| Spray-on | | | |
| Perfume | 0.3 | 0.3 | 0.5 |
| C45E7 | 4.0 | 4.0 | 4.0 |
| C25E3 | 2.0 | 2.0 | 2.0 |
| Dry additives | | | |
| MA/AA | — | — | 3.0 |
| Na-SKS-6 | — | — | 12.0 |
| Citrate | 10.0 | — | 8.0 |
| Bicarbonate | 7.0 | 3.0 | 5.0 |
| Carbonate | 8.0 | 5.0 | 7.0 |
| PVPVI/PVNO | 0.5 | 0.5 | 0.5 |
| Protease | 0.03 | 0.02 | 0.05 |
| Lipase | 0.008 | 0.008 | 0.008 |
| Amylase | 0.01 | 0.01 | 0.01 |
| Cellulase | 0.001 | 0.001 | 0.001 |
| CBD-Hexosaminidase | — | 0.05 | 0.05 |
| CBD-Indolicidin | 0.008 | — | — |
| Silicone antifoam | 5.0 | 5.0 | 5.0 |
| Sulfate | — | 9.0 | — |
| Density (g/litre) | 700 | 700 | 700 |
| Miscellaneous and minors | Up to 100% | | |

EXAMPLE 6

The following detergent compositions were prepared according to the present invention:

| | I | II | III | IV |
|---|---|---|---|---|
| Base granule | | | | |
| Zeolite A | 30.0 | 22.0 | 24.0 | 10.0 |
| Sulfate | 10.0 | 5.0 | 10.0 | 7.0 |
| MA/AA | 3.0 | — | — | — |
| AA | — | 1.6 | 2.0 | — |
| MA/AA 1 | — | 12.0 | — | 6.0 |

-continued

| | I | II | III | IV |
|---|---|---|---|---|
| LAS | 14.0 | 10.0 | 9.0 | 20.0 |
| C45AS | 8.0 | 7.0 | 9.0 | 7.0 |
| C45AES | — | 1.0 | 1.0 | — |
| Silicate | — | 1.0 | 0.5 | 10.0 |
| Soap | — | 2.0 | — | — |
| Brightener 1 | 0.2 | 0.2 | 0.2 | 0.2 |
| Carbonate | 6.0 | 9.0 | 10.0 | 10.0 |
| PEG4000 | — | 1.0 | 1.5 | — |
| DTPA | — | 0.4 | — | — |
| Spray On | | | | |
| C25E9 | — | — | — | 5.0 |
| C45E7 | 1.0 | 1.0 | — | — |
| C23E9 | — | 1.0 | 2.5 | — |
| Perfume | 0.2 | 0.3 | 0.3 | — |
| Dry additives | | | | |
| Carbonate | 5.0 | 10.0 | 18.0 | 8.0 |
| PVPVI/PVNO | 0.5 | — | 0.3 | — |
| CBD-Protocatechuate | 0.005 | 0.05 | 0.03 | — |
| CBD-Hexosaminidase | — | — | 0.001 | 0.002 |
| CBD-cecropin | — | — | — | 0.002 |
| Protease | 0.03 | 0.03 | 0.03 | 0.02 |
| Lipase | 0.008 | — | — | 0.008 |
| Amylase | 0.002 | — | — | 0.002 |
| Cellulase | 0.0002 | 0.0005 | 0.0005 | 0.0002 |
| NOBS | — | 4.0 | — | 4.5 |
| PB1 | 1.0 | 5.0 | 1.5 | 6.0 |
| Sulfate | 4.0 | 5.0 | — | 5.0 |
| SRP 1 | — | 0.4 | — | — |
| Suds suppressor | — | 0.5 | 0.5 | — |
| Miscellaneous and minors | | Up to 100% | | |

EXAMPLE 7

The following granular detergent compositions were prepared according to the present invention:

| | I | II | III |
|---|---|---|---|
| Blown Powder | | | |
| Zeolite A | 20.0 | — | 15.0 |
| STPP | — | 20.0 | — |
| Sulfate | — | — | 5.0 |
| Carbonate | — | — | 5.0 |
| TAS | — | — | 1.0 |
| LAS | 6.0 | 6.0 | 6.0 |
| C6BAS | 2.0 | 2.0 | — |
| Silicate 3.0 | 8.0 | — | |
| MA/AA | 4.0 | 2.0 | 2.0 |
| CMC | 0.6 | 0.6 | 0.2 |
| Brightener 1 | 0.2 | 0.2 | 0.1 |
| DETPMP | 0.4 | 0.4 | 0.1 |
| STS | — | — | 1.0 |
| Spray On | | | |
| C45E7 | 5.0 | 5.0 | 4.0 |
| Silicone antifoam 0.3 | 0.3 | 0.1 | |
| Perfume | 0.2 | 0.2 | 0.3 |
| Dry additives | | | |
| QEA | — | — | 1.0 |
| Carbonate | 14.0 | 9.0 | 10.0 |
| PB1 | 1.5 | 2.0 | |
| PB4 | 18.5 | 13.0 | 13.0 |
| TAED | 2.0 | 2.0 | 2.0 |
| QAS | — | — | 1.0 |
| Photoactivated bleach | 15 ppm | 15 ppm | 15 ppm |
| Na-SKS-6 | — | — | 3.0 |
| CBD-Dextranase | 0.1 | 0.05 | 0.001 |
| Protease | 0.03 | 0.03 | 0.007 |

-continued

| | I | II | III |
|---|---|---|---|
| Lipase | 0.004 | 0.004 | 0.004 |
| Amylase | 0.006 | 0.006 | 0.003 |
| Cellulase 0.0002 | 0.0002 | 0.0005 | |
| Sulfate | 10.0 | 20.0 | 5.0 |
| Density (g/litre) | 700 | 700 | 700 |
| Miscellaneous and minors | | Up to 100% | |

EXAMPLE 8

The following detergent compositions were prepared according to the present invention:

| | I | II | III |
|---|---|---|---|
| Blown Powder | | | |
| Zeolite A | 15.0 | 15.0 | 15.0 |
| Sulfate | — | 5.0 | — |
| LAS | 3.0 | 3.0 | 3.0 |
| QAS | — | 1.5 | 1.5 |
| DETPMP | 0.4 | 0.2 | 0.4 |
| EDDS | — | 0.4 | 0.2 |
| CMC | 0.4 | 0.4 | 0.4 |
| MA/AA | 4.0 | 2.0 | 2.0 |
| Agglomerate | | | |
| LAS | 5.0 | 5.0 | 5.0 |
| TAS | 2.0 | 2.0 | 1.0 |
| Silicate | 3.0 | 3.0 | 4.0 |
| Zeolite A | 8.0 | 8.0 | 8.0 |
| Carbonate | 8.0 | 8.0 | 4.0 |
| Spray On | | | |
| Perfume | 0.3 | 0.3 | 0.3 |
| C45E7 | 2.0 | 2.0 | 2.0 |
| C25E3 | 2.0 | — | |
| Dry Additives | | | |
| Citrate | 5.0 | — | 2.0 |
| Bicarbonate | — | 3.0 | — |
| Carbonate | 8.0 | 15.0 | 10.0 |
| TAED | 6.0 | 2.0 | 5.0 |
| PB1 | 14.0 | 7.0 | 10.0 |
| PEO | — | — | 0.2 |
| Bentonite clay | — | — | 10.0 |
| CBD-Dextranase | 0.03 | — | — |
| CBD-Protamine | — | 0.03 | — |
| CBD-Indolicidin | — | — | 0.03 |
| Protease | 0.03 | 0.03 | 0.03 |
| Lipase | 0.008 | 0.008 | 0.008 |
| Cellulase | 0.001 | 0.001 | 0.001 |
| Amylase | 0.01 | 0.01 | 0.01 |
| Silicone antifoam | 5.0 | 5.0 | 5.0 |
| Sulfate | — | 3.0 | — |
| Density (g/litre) | 850 | 850 | 850 |
| Miscellaneous and minors | | Up to 100% | |

EXAMPLE 9

The following detergent compositions were prepared according to the present invention:

| | I | II | III | IV |
|---|---|---|---|---|
| LAS | 18.0 | 14.0 | 24.0 | 20.0 |
| QAS | 0.7 | 1.0 | — | 0.7 |
| TFM | — | 1.0 | — | — |

-continued

| | I | II | III | IV |
|---|---|---|---|---|
| C23E56.5 | — | — | 1.0 | — |
| C45E7 | — | 1.0 | — | — |
| C45E3S | 1.0 | 2.5 | 1.0 | — |
| STPP | 32.0 | 18.0 | 30.0 | 22.0 |
| Silicate | 9.0 | 5.0 | 9.0 | 8.0 |
| Carbonate | 11.0 | 7.5 | 10.0 | 5.0 |
| Bicarbonate | — | 7.5 | — | — |
| PB1 | 3.0 | 1.0 | — | — |
| PB4 | — | 1.0 | — | — |
| NOBS | 2.0 | 1.0 | — | — |
| DETPMP | — | 1.0 | — | — |
| DTPA | 0.5 | — | 0.2 | 0.3 |
| SRP 1 | 0.3 | 0.2 | — | 0.1 |
| MA/AA | 1.0 | 1.5 | 2.0 | 0.5 |
| CMC | 0.8 | 0.4 | 0.4 | 0.2 |
| PEI | — | — | 0.4 | — |
| Sulfate | 20.0 | 10.0 | 20.0 | 30.0 |
| Mg sulfate | 0.2 | — | 0.4 | 0.9 |
| CBD-Hexosaminidase | 0.01 | 0.005 | 0.05 | — |
| CBD-Protocatechuate | — | 0.002 | — | 0.01 |
| Protease | 0.03 | 0.03 | 0.02 | 0.02 |
| Amylase | 0.008 | 0.007 | — | 0.004 |
| Lipase | 0.004 | — | 0.002 | — |
| Cellulase | 0.0003 | — | — | 0.0001 |
| Photoactivated bleach | 30 ppm | 20 ppm | — | 10 ppm |
| Perfume | 0.3 | 0.3 | 0.1 | 0.2 |
| Brightener 1/2 | 0.05 | 0.02 | 0.08 | 0.1 |
| Miscellaneous and minors | | up to 100% | | |

EXAMPLE 10

The following liquid detergent formulations were prepared according to the present invention (Levels are given in parts per weight, enzyme are expressed in pure enzyme):

| | I | II | III | IV | V |
|---|---|---|---|---|---|
| LAS | 11.5 | 8.8 | — | 3.9 | — |
| C25E2.5S | — | 3.0 | 18.0 | — | 16.0 |
| C45E2.25S | 11.5 | 3.0 | — | 15.7 | — |
| C23E9 | — | 2.7 | 1.8 | 2.0 | 1.0 |
| C23E7 | 3.2 | — | — | — | — |
| CFM | — | — | 5.2 | — | 3.1 |
| TPKFA | 1.6 | — | 2.0 | 0.5 | 2.0 |
| Citric (50%) | 6.5 | 1.2 | 2.5 | 4.4 | 2.5 |
| Ca formate | 0.1 | 0.06 | 0.1 | — | — |
| Na formate | 0.5 | 0.06 | 0.1 | 0.05 | 0.05 |
| SCS | 4.0 | 1.0 | 3.0 | 1.2 | — |
| Borate | 0.6 | — | 3.0 | 2.0 | 2.9 |
| Na hydroxide | 5.8 | 2.0 | 3.5 | 3.7 | 2.7 |
| Ethanol | 1.75 | 1.0 | 3.6 | 4.2 | 2.9 |
| 1,2 Propanediol | 3.3 | 2.0 | 8.0 | 7.9 | 5.3 |
| Monoethanolamine | 3.0 | 1.5 | 1.3 | 2.5 | 0.8 |
| TEPAE | 1.6 | — | 1.3 | 1.2 | 1.2 |
| CBD-Hexosaminidase | 0.005 | — | 0.03 | 0.07 | — |
| CBD-Cecropin | 0.005 | 0.01 | — | — | 0.05 |
| Protease | 0.03 | 0.01 | 0.03 | 0.02 | 0.02 |
| Lipase | — | — | 0.002 | — | — |
| Amylase | — | — | — | 0.002 | — |
| Cellulase | — | — | 0.0002 | 0.0005 | 0.0001 |
| SRP 1 | 0.2 | — | 0.1 | — | — |
| DTPA | — | — | 0.3 | — | — |
| PVNO | — | — | 0.3 | — | 0.2 |
| Brightener 1 | 0.2 | 0.07 | 0.1 | — | — |
| Silicone antifoam | 0.04 | 0.02 | 0.1 | 0.1 | 0.1 |
| Miscellaneous and water | | | | | |

EXAMPLE 11

The following liquid detergent formulations were prepared according to the present invention (Levels are given in parts per weight, enzyme are expressed in pure enzyme):

| | I | II | III | IV |
|---|---|---|---|---|
| LAS | 10.0 | 13.0 | 9.0 | — |
| C25AS | 4.0 | 1.0 | 2.0 | 10.0 |
| C25E3S | 1.0 | — | — | 3.0 |
| C25E7 | 6.0 | 8.0 | 13.0 | 2.5 |
| TFAA | — | — | — | 4.5 |
| APA | — | 1.4 | — | — |
| TPKFA | 2.0 | — | 13.0 | 7.0 |
| Citric | 2.0 | 3.0 | 1.0 | 1.5 |
| Dodecenyl/tetradecenyl succinic acid | 12.0 | 10.0 | — | — |
| Rapeseed fatty acid | 4.0 | 2.0 | 1.0 | — |
| Ethanol | 4.0 | 4.0 | 7.0 | 2.0 |
| 1,2 Propanediol | 4.0 | 4.0 | 2.0 | 7.0 |
| Monoethanolamine | — | — | — | 5.0 |
| Triethanolamine | — | — | 8.0 | — |
| TEPAE | 0.5 | — | 0.5 | 0.2 |
| DETPMP | 1.0 | 1.0 | 0.5 | 1.0 |
| CBD-Dextranase | — | 0.05 | 0.03 | 0.1 |
| CBD-Protamine | 0.05 | — | — | — |
| Protease | 0.02 | 0.02 | 0.01 | 0.008 |
| Lipase | — | 0.002 | — | 0.002 |
| Amylase | 0.004 | 0.004 | 0.01 | 0.008 |
| Cellulase | — | — | — | 0.002 |
| SRP 2 | 0.3 | — | 0.3 | 0.1 |
| Boric acid | 0.1 | 0.2 | 1.0 | 2.0 |
| Ca chloride | — | 0.02 | — | 0.01 |
| Brightener 1 | — | 0.4 | — | — |
| Suds suppressor | 0.1 | 0.3 | — | 0.1 |
| Opacifier | 0.5 | 0.4 | — | 0.3 |
| NaOH up to pH | 8.0 | 8.0 | 7.6 | 7.7 |
| Miscellaneous and water | | | | |

EXAMPLE 12

The following liquid detergent compositions were prepared according to the present invention (Levels are given in parts per weight, enzyme are expressed in pure enzyme):

| | I | II | III | IV |
|---|---|---|---|---|
| LAS | 25.0 | — | — | — |
| C25AS | — | 13.0 | 18.0 | 15.0 |
| C25E3S | — | 2.0 | 2.0 | 4.0 |
| C25E7 | — | — | 4.0 | 4.0 |
| TFAA | — | 6.0 | 8.0 | 8.0 |
| APA | 3.0 | 1.0 | 2.0 | — |
| TPKFA | — | 15.0 | 11.0 | 11.0 |
| Citric | 1.0 | 1.0 | 1.0 | 1.0 |
| Dodecenyl/tetradecenyl succinic acid | 15.0 | — | — | — |
| Rapeseed fatty acid | 1.0 | — | 3.5 | — |
| Ethanol | 7.0 | 2.0 | 3.0 | 2.0 |
| 1,2 Propanediol | 6.0 | 8.0 | 10.0 | 13.0 |
| Monoethanolamine | — | — | 9.0 | 9.0 |
| TEPAE | — | — | 0.4 | 0.3 |
| DETPMP | 2.0 | 1.2 | 1.0 | — |
| CBD-Cecropin | 0.05 | 0.05 | 0.01 | 0.0005 |
| Protease | 0.08 | 0.02 | 0.01 | 0.02 |
| Lipase | — | — | 0.003 | 0.003 |
| Amylase | 0.004 | 0.01 | 0.01 | 0.01 |
| Cellulase | — | — | 0.004 | 0.003 |
| SRP 2 | — | — | 0.2 | 0.1 |
| Boric acid | 1.0 | 1.5 | 2.5 | 2.5 |
| Bentonite clay | 4.0 | 4.0 | — | — |
| Brightener 1 | 0.1 | 0.2 | 0.3 | — |
| Suds suppressor | 0.4 | — | — | — |
| Opacifier | 0.8 | 0.7 | — | — |
| NaOH up to Ph | 8.0 | 7.5 | 8.0 | 8.2 |
| Miscellaneous and water | | | | |

EXAMPLE 13

The following liquid detergent compositions were prepared according to the present invention (Levels are given in parts by weight, enzyme are expressed in pure enzyme):

| | I | II | III |
|---|---|---|---|
| LAS | 27.6 | 18.9 | 18.9 |
| C45AS | 13.8 | 5.9 | 5.9 |
| C13E8 | 3.0 | 3.1 | 3.1 |
| Oleic acid | 3.4 | 2.5 | 2.5 |
| Citric | 5.4 | 5.4 | 5.4 |
| Na hydroxide | 0.4 | 3.6 | 3.6 |
| Ca Formate | 0.2 | 0.1 | 0.1 |
| Na Formate | — | 0.5 | 0.5 |
| Ethanol | 7.0 | — | — |
| Monoethanolamine | 16.5 | 8.0 | 8.0 |
| 1,2 propanediol | 5.9 | 5.5 | 5.5 |
| Xylene sulfonic acid | — | 2.4 | 2.4 |
| TEPAE | 1.5 | 0.8 | 0.8 |
| Protease | 0.05 | 0.02 | 0.02 |
| CBD-Protocatechuate | 0.008 | 0.05 | — |
| CBD-Indolicidin | 0.001 | — | 0.05 |
| PEG | — | 0.7 | 0.7 |
| Brightener 2 | 0.4 | 0.1 | 0.1 |
| Perfume | 0.5 | 0.3 | 0.3 |
| Water and Minors | | | |

EXAMPLE 14

The following granular fabric detergent compositions which provide "softening through the wash" capability were prepared according to the present invention:

| | I | II |
|---|---|---|
| C45AS | — | 10.0 |
| LAS | 7.6 | — |
| C68AS | 1.3 | — |
| C45E7 | 4.0 | — |
| C25E3 | — | 5.0 |
| Coco-alkyl-dimethyl hydroxy-ethyl ammonium chloride | 1.4 | 1.0 |
| Citrate | 5.0 | 3.0 |
| Na-SKS-6 | — | 11.0 |
| Zeolite A | 15.0 | 15.0 |
| MA/AA | 4.0 | 4.0 |
| DETPMP | 0.4 | 0.4 |
| PB1 | 15.0 | — |
| Percarbonate | — | 15.0 |
| TAED | 5.0 | 5.0 |
| Smectite clay | 10.0 | 10.0 |
| HMWPEO | — | 0.1 |
| CBD-Protamine | 0.005 | 0.01 |
| Protease | 0.02 | 0.01 |
| Lipase | 0.02 | 0.01 |
| Amylase | 0.03 | 0.005 |
| Cellulase | 0.001 | — |
| Silicate | 3.0 | 5.0 |
| Carbonate | 10.0 | 10.0 |
| Suds suppressor | 1.0 | 4.0 |
| CMC | 0.2 | 0.1 |
| Miscellaneous and minors | Up to 100% | |

EXAMPLE 15

The following rinse added fabric softener compositions were prepared according to the present invention:

| | I | II | III |
|---|---|---|---|
| DEQA (2) | 20.0 | 20.0 | 20.0 |
| CBD-Hexosaminidase | 0.05 | — | — |
| CBD-Protamine | — | 0.03 | — |
| CBD-Indolicidin | — | — | 0.05 |
| Cellulase | 0.001 | 0.001 | 0.001 |
| HCL | 0.03 | 0.03 | 0.03 |
| Antifoam agent | 0.01 | 0.01 | 0.01 |
| Blue dye | 25 ppm | 25 ppm | 25 ppm |
| $CaCl_2$ | 0.20 | 0.20 | 0.20 |
| Perfume | 0.90 | 0.90 | 0.90 |
| Miscellaneous and water | Up to 100% | | |

EXAMPLE 16

The following fabric softener and dryer added fabric conditioner compositions were prepared according to the present invention:

| | I | II | III | IV | V |
|---|---|---|---|---|---|
| DEQA | 2.6 | 19.0 | — | — | — |
| DEQA(2) | — | — | — | — | 51.8 |
| DTMAMS | — | — | — | 26.0 | — |
| SDASA | — | — | 70.0 | 42.0 | 40.2 |
| Stearic acid of IV = 0 | 0.3 | — | — | — | — |
| Neodol 45-13 | — | — | 13.0 | — | — |
| Hydrochloride acid | 0.02 | 0.02 | — | — | — |
| Ethanol | — | — | 1.0 | — | — |
| CBD-Cecropin | 0.05 | 0.008 | 0.002 | 0.01 | 0.05 |
| Perfume | 1.0 | 1.0 | 0.75 | 1.0 | 1.5 |
| Glycoperse S-20 | — | — | — | — | 15.4 |
| Glycerol monostearate | — | — | — | 26.0 | — |
| Digeranyl Succinate | — | — | 0.38 | — | — |
| Silicone antifoam | 0.01 | 0.01 | — | — | — |
| Electrolyte | — | 0.1 | — | — | — |
| Clay | — | — | — | 3.0 | — |
| Dye | 10 ppm | 25ppm | 0.01 | — | — |
| Water and minors | 100% | 100% | — | — | — |

EXAMPLE 17

The following laundry bar detergent compositions were prepared according to the present invention (Levels are given in parts per weight, enzyme are expressed in pure enzyme):

| I II III VI V III VI V |
|---|
| LAS ——19.0 15.0 21.0 6.75 8.8 — |
| C28AS 30.0 13.5 ———15.75 11.2 22.5 |
| Na Laurate 2.5 9.0 —————— |
| Zeolite A 2.0 1.25 ———1.25 1.25 1.25 |
| Carbonate 20.0 3.0 13.0 8.0 10.0 15.0 15.0 10.0 |
| Ca Carbonate 27.5 39.0 35.0 ——40.0 —40.0 |
| Sulfate 5.0 5.0 3.0 5.0 3.0 ——5.0 |
| TSPP 5.0 ————5.0 2.5 — |
| STPP 5.0 15.0 10.0 ——7.0 8.0 10.0 |
| Bentonite clay —10.0 ——5.0 ——— |
| DETPMP —0.7 0.6 —0.6 0.7 0.7 0.7 |
| CMC —1.0 1.0 1.0 1.0 ——1.0 |
| Talc ——10.0 15.0 10.0 ——— |
| Silicate ——4.0 5.0 3.0 ——— |
| PVNO 0.02 0.03 —0.01 —0.02 —— |
| MA/AA 0.4 1.0 ——0.2 0.4 0.5 0.4 |
| SRP 1 0.3 0.3 0.3 0.3 0.3 0.3 0.3 0.3 |
| CBD-Cecropin 0.05 0.05 0.01 0.005 ——0.01 0.05 |

-continued

| I II III VI V III VI V |
|---|
| CBD- ————0.05 0.007 —— |
| Dextranase |
| Amylase ——0.01 ———0.002 — |
| Protease —0.004 —0.003 0.003 ——0.003 |
| Lipase —0.002 —0.002 ———— |
| Cellulase —.0003 ——.0003 .0002 —— |
| PEO —0.2 —0.2 00.3 ——0.3 |
| Perfume 1.0 0.5 0.3 0.2 0.4 ——0.4 |
| Mg sulfate ——3.0 3.0 3.0 ——— |
| Brightener 0.15 0.1 0.15 ————0.1 |
| Photoactivated —15.0 15.0 15.0 15.0 ——15.0 |
| bleach (ppm) |

EXAMPLE 18

The following detergent additive compositions were prepared according to the present invention:

| | I | II | III |
|---|---|---|---|
| LAS | — | 5.0 | 5.0 |
| STPP | 30.0 | — | 20.00 |
| Zeolite A | — | 35.0 | 20.0 |
| PB1 | 20.0 | 15.0 | — |
| TAED | 10.0 | 8.0 | — |
| CBD-Hexosaminidase | 0.03 | 0.05 | — |
| CBD-Protamine | — | 0.05 | 0.05 |
| Protease | — | 0.3 | 0.3 |
| Amylase | — | 0.06 | 0.06 |
| Minors, water and miscellaneous | | Up to 100% | |

What is claimed is:

1. A modified protein which comprises a catalytically active amino acid sequence of an antimicrobial enzyme and/or an amino acid sequence of an antimicrobial peptide, linked to an amino acid sequence comprising a cellulose binding domain wherein said catalytically active amino acid sequence derives from an antimicrobial enzyme selected from the group consisting of: Exo-α-N acetyl gluosaminidase, Endo-β-N-acetyl glucosaminidase, N-acetyl-β-glucosaminidase, Dextranase, Lyticase; Xanthine oxidase, Protocatechuate 3,4 oxidoreductase, Catechol dioxygenase, Lipoxygenases, Hexosaminidase and combinations thereof;

further wherein said cellulose binding domain is selected from the group consisting of CBD CenC, CenA, Cex from *Cellulomonas fimi*, GBD CBHI from *Trichoderma reesei*, CBD Cellulozome from *Clostridium cellulovarans*, CBD E3 from *Thermonospora fusca*, CBD-dimer from *Clostridium stecorarium* XynA, CBD from *Bacillus agaradherens*, CBD family 45 from *Humicola insolens* and mixtures thereof;

further wherein said catalytically active amino acid sequence of an antimicrobial enzyme and/or amino acid sequence of an antimicrobial peptide is linked to said amino acid sequence comprising a cellulose binding domain, via an amino or non-amino linking region selected from the group consisting of: polyethylene glycol derivatives, nucleophilic polyethylene glycol derivatives, carboxyl polyethylene glycol derivatives, electrophilically activated polyethylene glycol derivatives, sulfhydryl-selective polyethylene glycol derivatives, heterofunctional polyethylene glycol derivatives, biotin polyethylene glycol derivatives, vinyl polyethylene glycol derivatives, silane polyethylene glycol derivatives, phospholipid polyethylene glycol derivatives, 1-ethyl-3-(3-dimethylaminopropyl) carbodiimide, N-ethyl-5-phenylisaoxolium-3-sulphonate, 1-cylohexyl-3(2-morpholineothyl) carbodide metho-p-toluene sulphonate, N-ethoxycarbonyl-2-ethoxy 1,2 dihydroquinoline or glutaraldehyde, *Humicola insolens family* 45 cellulase linker, NifA gene of *Kiebsiella pneumoniae*-CiP linker, *E. coli* OmpA gene-CiP liner, E3 cellulase *Thermomonospora fusca* linker, CenA cellulase linker and combinations thereof.

2. A modified protein according to claim 1 wherein said amino acid sequence of an antimicrobial peptide is selected from the group consisting of protoamines, cecropins, magainins, defensins and mixtures thereof.

3. A laundry detergent and/or fabric care composition comprising a laundry detergent and/or fabric care ingredient and a modified protein according to claim 1.

4. A laundry detergent and/or fabric care composition according to claim 3 wherein said laundry detergent and/or fabric care ingredient is a surfactant selected from the group consisting of cationic, anionic, nonionic surfactants and mixtures thereof.

5. A fabric care composition according to claim 4 wherein said cationic surfactant comprises two long alkyl chain lengths.

6. A laundry detergent and/or fabric care composition according claim 3 wherein said laundry detergent and/or fabric care ingredient is a bleaching agent.

7. A method of sanitisation comprising the step of contracting a fabric with a laundry detergent and/or fabric care composition according to claim 3.

8. A method comprising the step of contracting a fabric with a laundry detergent and/or fabric care compositions according to claim 3 for fabric cleaning and/or fabric stain removal and/or fabric whiteness maintenance.

* * * * *